(12) United States Patent
Konig et al.

(10) Patent No.: US 7,805,443 B2
(45) Date of Patent: Sep. 28, 2010

(54) DATABASE CONFIGURATION ANALYSIS

(75) Inventors: Arnd Christian Konig, Redmond, WA (US); Shubha Umesh Nabar, Stanford, CA (US)

(73) Assignee: Microsoft Corporation, Redmond, WA (US)

( * ) Notice: Subject to any disclaimer, the term of this patent is extended or adjusted under 35 U.S.C. 154(b) by 130 days.

(21) Appl. No.: 11/275,657

(22) Filed: Jan. 20, 2006

(65) Prior Publication Data

US 2007/0174335 A1    Jul. 26, 2007

(51) Int. Cl.
G06F 7/00  (2006.01)
(52) U.S. Cl. ...................................... 707/736
(58) Field of Classification Search ............... 707/104.1
See application file for complete search history.

(56) References Cited

U.S. PATENT DOCUMENTS

| | | | |
|---|---|---|---|
| 5,485,610 | A | 1/1996 | Gioielli et al. |
| 5,960,423 | A | 9/1999 | Chaudhuri et al. |
| 6,169,983 | B1 | 1/2001 | Chaudhuri et al. |
| 6,223,171 | B1 | 4/2001 | Chaudhuri et al. |
| 6,266,658 | B1 * | 7/2001 | Adya et al. .................. 707/2 |
| 6,278,989 | B1 | 8/2001 | Chaudhuri et al. |
| 6,363,371 | B1 | 3/2002 | Chaudhuri et al. |
| 6,366,903 | B1 | 4/2002 | Agrawal et al. |
| 6,405,364 | B1 | 6/2002 | Bowman-Amuah |
| 6,480,839 | B1 | 11/2002 | Whittington et al. |
| 6,529,901 | B1 | 3/2003 | Chaudhuri et al. |
| 6,766,318 | B1 | 7/2004 | Guay et al. |
| 6,801,903 | B2 | 10/2004 | Brown et al. |
| 6,889,221 | B1 | 5/2005 | Luo et al. |
| 2004/0260684 | A1 | 12/2004 | Agrawal et al. |
| 2005/0033739 | A1 * | 2/2005 | Chaudhuri et al. ............ 707/3 |
| 2005/0256889 | A1 | 11/2005 | McConnel |

OTHER PUBLICATIONS

Peter J. Hass, Christian Konig, A Bi-Level Bernoulli Scheme for Database Sampling, Jun. 13-18, 2004, SIGMOD 2004.*

S. Agrawal et al., "Database Tuning Advisor for Microsoft SQL Server 2005", Proc. of the 30th VLDB Conf., Toronto, Canada, 2004.

N. Bruno et al., "Automatic Physical Database Tuning: A Relaxation-based Approach", in ACM SIGMOD Conf., 2005.

S. Chaudhuri et al., "Compressing SQL Workloads", In Proc. of ACM SIGMOD Conf., 2002.

S. Chaudhuri et al., "SQLCM: A Continuous Monitoring Framework for Relational Database Engines", In Proc. of 20th ICDE Conf., 2004.

(Continued)

*Primary Examiner*—Tony Mahmoudi
*Assistant Examiner*—Jensen Hu

(57) ABSTRACT

To determine a configuration for a database system, a plurality of queries may be sampled from a representative workload using statistical inference to compute the probability of correctly selecting one of a plurality of evaluation configurations. The probability of correctly selecting may determine which and/or how many queries to sample, and/or may be compared to a target probability threshold to determine if more queries must be sampled. The configuration from the plurality of configurations with the lowest estimated cost of executing the representative workload may be determined based on the probability of selecting correctly. Estimator variance may be reduced through a stratified sampling scheme that leverages commonality, such as an average cost of execution, between queries based on query templates. The applicability of the Central Limit Theorem may be verified and used to determine which and/or how many queries to sample.

20 Claims, 10 Drawing Sheets

OTHER PUBLICATIONS

S. Chaudhuri et al., "An Efficient, Cost-Driven Index Selection Tool for Microsoft SQL Server", In Proc. the 23$^{rd}$ VLDB Conf., Athens, Greece, 1997.

S. Chaudhuri et al., "AutoAdmin "What-if" Index Analysis Utility", In Proc. of ACM SIGMOD Conf., Seattle, WA, USA, 1998.

W. G. Cochran, "Sampling Techniques", Wiley, 1977, pp. 39-44, 96-101.

B. Dageville et al., "Automatic SQL Tuning in Oracle 10g", In Proc. of the 30$^{th}$ VLDB Conf., 2004.

S. Ferson et al., "Computing Variance for Interval Data is NP-Hard", In ACM SIGACT News, vol. 33, No. 2, pp. 108-118, 2002.

S. Ferson et al., "Exact Bounds on Finite Populations of Interval Data", Technical Report UTEP-CS-02-13d, University of Texas at El Paso, 2002.

S. Finkelstein et al., "Physical Database Design for Relational Databases", In ACM TODS, 13 (1), 1988.

Y. Ioannidis et al., "Optimal Histograms for Limiting Worst-Case Error Propagation in the Size of Join Results", In ACM TODS, 1993.

Seong-Hee Kim et al., Selecting the Best System: Theory and Methods, In Proc. of the 2003 Winter Simulation Conf., pp. 101-112.

V. Kreinovich et al., "Computing Higher Central Moments for Interval Data", Technical Report UTEP-CS-03-14, University of Texas at El Paso, 2003.

N. M. Steiger et al., "Improved Batching For Confidence Interval Construction in Steady-State Simulation", In Proc. of the 1999 Winter Simulation Conf., 2000.

M. Stillger et al., "LEO—DB2's LEarning Optimizer", In Proc. of the 27$^{th}$ Conference on Very Large Databases, 2001.

R.A. Sugden et al., "Cochran's rule for simple random sampling", In Journal of the Royal Statistical Society, pp. 787-793, 2000.

D.C. Zilio et al., "DB2 Design Advisor: Integrated Automatic Physical Database Design", Proc. of the 30$^{th}$ VLDB Conf., Canada, 2004.

N. Bruno et al., "Scalable Exploration of Physical Database Design", Data Management, Exploration and Mining, presented at the Faculty Summit on Jul. 18, 2005.

\* cited by examiner

DATABASE CONFIGURATION ANALYSIS

BACKGROUND

The performance of applications running against database systems, such as enterprise database systems, may depend on the database design chosen. A database configuration, as used herein, is defined as one or more tables, one or more indices, one or more views, or any combination thereof. To explore potential database configuration designs, typical data systems have incorporated application program interfaces (APIs) that allow "what-if" analysis, which take as an input a query Q and a database configuration C, and return the optimizer-estimated cost of executing Q if configuration C were present.

Tuning the database design may be defined as receiving a representative query workload WL (i.e., a series of queries Q) and constraints on the configuration space, and outputting a configuration from within the configuration space in which executing the workload WL has the least possible cost (as measured by the optimizer cost model). Cost may be defined as the estimated time to execute the workload. To determine the best configuration within the configuration space, a number of candidate configurations from the configuration space are enumerated and then evaluated using the "what-if" analysis such as in a database tuner.

The representative workload is typically obtained by generating queries with a generator tool or tracing the queries that execute against a production system. To trace the queries, a tracing tool, such as IBM Query Patroler, SQL Server Profiler, ADDM, and the like, may be used over a representative period of time on the production system. The tracing may produce a large number of executed queries or statements in this time. To limit the overhead of repeated optimizer calls to evaluate large numbers of configurations/query combinations, typical data design tools may reduce the number of queries for which the optimizer calls are issued by compressing the workload up-front, i.e., initially selecting a subset of queries and then tuning the database design based only this smaller set of queries to determine an optimal database configuration.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

To limit the overhead cost of determining the cost of a large representative workload, the calls to an optimizer may be reduced by sampling from the large workload. The queries to be analyzed may be sampled from the representative workload WL; now, statistical inference can be used to compute the probability of selecting one of a plurality of evaluation configurations correctly from the large workload. The probability of selecting the correct configuration may be used to determine which queries to sample, to determine how many queries to sample, and/or to limit or end the determination of cost for a given configuration, e.g., be used as an end process threshold when compared to a target probability of correct selection α. Specifically, queries may be sampled from the representative workload WL to form a sample workload to compute the probability of selecting the correct configuration (i.e., the correct lowest cost configuration for executing the representative workload) and stopping sampling more queries once the target probability threshold is achieved. In this manner, the number of sampled queries used in evaluating the cost of configurations is responsive to the configuration space and the representative workload, which may reduce unnecessary calls to an optimizer module to determine cost and/or may improve configuration choice as compared to coarse sampling techniques. Accordingly, the configuration from the plurality of configurations with the lowest or at least a sufficiently reduced estimated cost of executing the representative workload WL may be determined based on the probability of selecting correctly.

The resulting determined configuration based on the representative workload and the probability of correct selection may be used in any suitable manner. For example, an interactive exploratory analysis of the configuration space may allow a database administrator to find promising candidates for full evaluation. In another example, the configuration comparison based on probability of correct selection may be used internal to an automated physical design tool, to provide scalability and/or local decisions with probabilistic certainty on the accuracy of each comparison. In another example, the determined configuration may be used to configure the database system by pre-computing and storing the appropriate indices and/or views in accordance with the determined configuration.

In a probabilistic approach to selecting queries within a large representative workload to analyze, the accuracy of the estimation of the probability of a correct selection may depend on the variance of the estimator used. To reduce estimator variance, a technique called delta sampling may be used, which leverages stability of query costs across configurations. Estimator variance may additionally or alternatively be reduced through a stratified sampling scheme that leverages commonality between queries based on query templates. To reduce the error in estimation, an estimator may be selected with as little variance as possible. The variance may be examined against an upper bound to determine its accuracy.

In sampling queries from the representative workload, the applicability of the Central Limit Theorem may be verified using an upper bound on the skew. The skew determines the number of queries required for the Central Limit Theorem to hold. Specifically, highly skewed distributions in the representative workload in which the sampled queries may not be representative of the overall distribution and/or the Central Limit Theorem may not apply for a given sample size may be improved by identifying when the distribution is highly skewed or verifying the applicability of the Central Limit Theorem.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Although the present examples are described and illustrated herein as being implemented in an enterprise database system, the system described is provided as an example and not a limitation. As those skilled in the art will appreciate, the present examples are suitable for application in a variety of different types of database systems.

To limit the overhead of repeated optimizer calls to evaluate large numbers of configurations/query combinations in tuning database system design, typical data design tools may reduce the number of queries for which the optimizer calls are issued by compressing the workload up-front, i.e., initially selecting a subset of queries and then tuning the database design based only this smaller set of queries. However, compressing the number of queries as a batch does not offer any guarantee of or insight into how the compression affects the likelihood of choosing the wrong configuration. In some cases, such guarantees or insights may be useful due to the significant overhead to a database administrator of changing the database design. Rather than assuming that the cost of a large workload is indicated by the determined cost of a batch compressions of the workload, the cost of a large workload for a database configuration may be determined by a database configuration system which provides a probabilistic determination of the likelihood of correctly choosing an improved or optimal database configuration for the large workload from a given set of candidate database configurations.

Although the present examples are described and illustrated herein as being implemented in database configuration system communicating with a single database system through a network connection, the database configuration environment described is provided as an example and not a limitation and it is to be appreciated that any number and types of services may be provided in any number and/or combination of the features described further below and may be provided by any number of computing devices in communication in any suitable manner.

Figure 1:
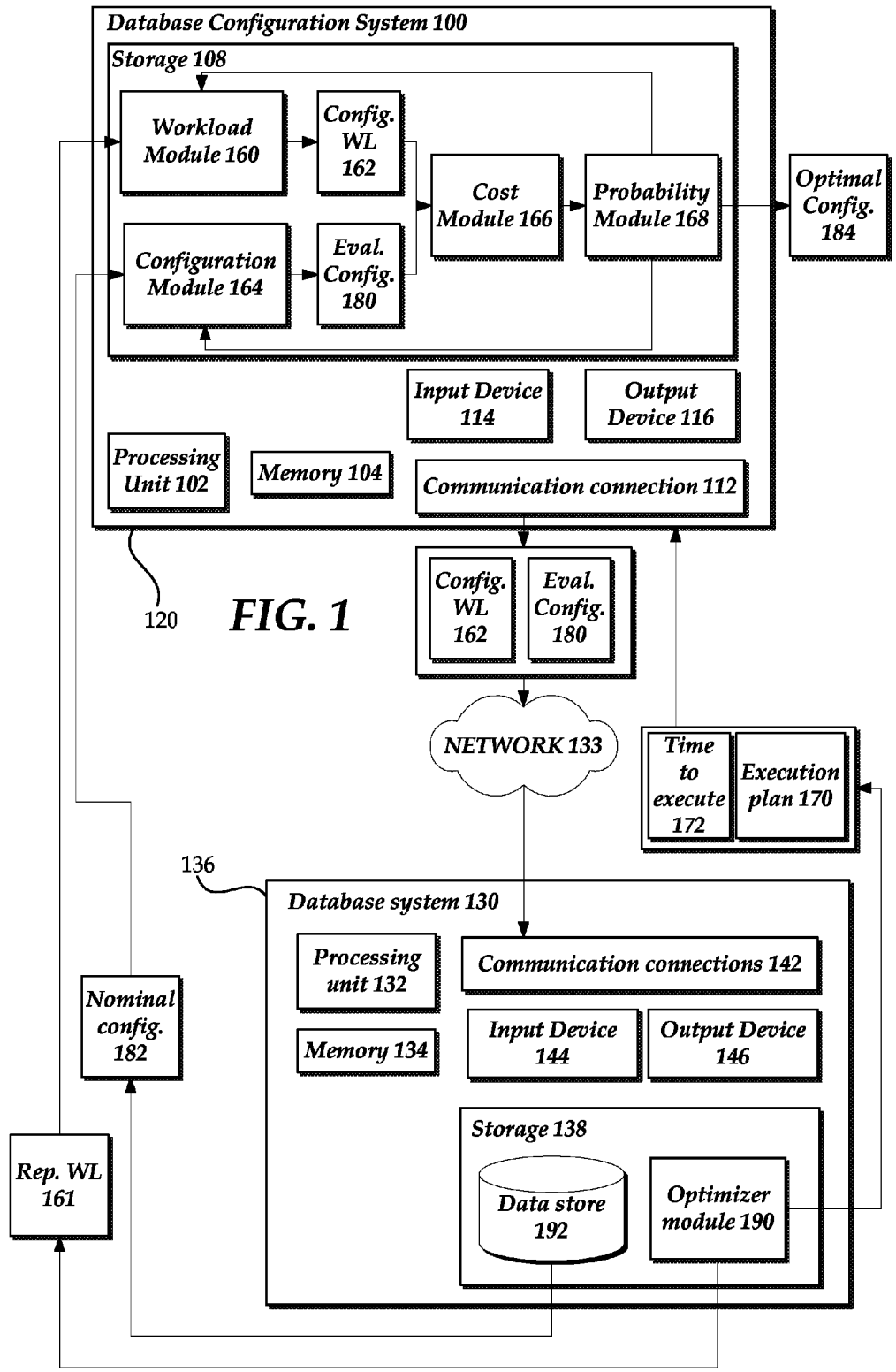
FIG. 1 is a schematic diagram of an example environment suitable for implementing a database configuration system.

FIG. 1 and the following discussion are intended to provide a brief, general description of a database configuration system 100. As shown in FIG. 1, a database configuration system 100 may be provided by one or more computing devices 120 in communication with one or more database systems 130 which may be provided by one or more computing devices 136. The database configuration system may be in communication with the one or more database systems 130 in any suitable manner, such as through a network represented by a network cloud 133 in FIG. 1, directly connected to the database system through a connection, as a part of the database system, and the like.

Network 133 may include many well-known components, such as routers, gateways, hubs, and the like and allows the computing device 120 to communicate via wired and/or wireless media. Network 133 may comprise a Wide Area Network (WAN), such as the Internet, a local area network (LAN), although a variety of other communication systems and/or methods using appropriate protocols may be used, including other types of WANs, LANs, wireless networks, phone lines, serial and/or parallel cables, coaxial cables, and any combination thereof.

The computing device 120 may provide a suitable computing environment to provide access to services available from the database system 130. Computing device 120 and computing device 136 of FIG. 1 and the following discussion are intended to provide a brief, general description of a suitable computing environment in which all or a portion of a database configuration system may be implemented.

The operating environment of the computing device 120 and the computing device 136 of FIG. 1 are only one example of a suitable operating environment and is not intended to suggest any limitation as to the scope of use or functionality of the operating environment. Other well known computing systems, environments, and/or configurations that may be suitable for use with a database configuration system 100 and/or database system 130 described herein include, but are not limited to, personal computers, server computers, handheld or laptop devices, multiprocessor systems, micro-processor based systems, programmable consumer electronics, network personal computers, mini computers, mainframe computers, distributed computing environments that include any of the above systems or devices, and the like.

Although not required, the database configuration system will be described in the general context of computer-executable instructions, such as program modules, being executed by one or more computers or other devices. Generally, program modules include routines, programs, objects, components, data structures, etc., that perform particular tasks or implement particular abstract data types. Typically, the functionality of the program modules may be combined or distributed as desired in various environments.

With reference to FIG. 1, an example system for implementing a database configuration system 100 includes a computing device 120. In its most basic configuration, computing device 120 typically includes at least one processing unit 102 and memory 104. Depending on the exact configuration and type of computing device, memory 104 may be volatile (such as RAM), non-volatile (such as ROM, flash memory, etc.) or some combination of the two.

Additionally, device 120 may also have additional features and/or functionality. For example, device 120 may also include additional storage 108 (e.g., removable and/or non-removable). Computer storage media includes volatile and nonvolatile, removable and non-removable media implemented in any method or technology for storage of information such as computer readable instructions, data structures, program modules, or other data. Memory 104 and storage 108 are examples of computer storage media. Computer storage media includes, but is not limited to, RAM, ROM, EEPROM, flash memory or other memory technology, CD-ROM, digital versatile disks (DVDs) or other optical storage, magnetic cassettes, magnetic tape, magnetic disk storage or other magnetic storage devices, or any other medium which can be used to store the desired information and which can be accessed by device 120. Any such computer storage media may be part of memory 104 and/or storage 108.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Device 120 may contain one or more communication connection(s) 112 that allow the device 120 to communicate with other devices, such as with other computing devices through network 133. Communications connection(s) 112 is an example of communication media. Communication media typically embodies computer readable instructions, data structures, program modules or other data in a modulated data signal such as a carrier wave or other transport mechanism and includes any information delivery media. The term 'modulated data signal' means a signal that has one or more of its characteristics set or changed in such a manner as to encode information in the signal. By way of example, and not limitation, communication media includes wired media such as a wired network or direct-wired connection, and wireless media such as acoustic, radio frequency, infrared, and other wireless media.

Device 120 may have one or more input device(s) 114 such as keyboard, mouse, pen, voice input device, touch input device, laser range finder, infra-red cameras, video input devices, and/or any other input device. Output device(s) 116 such as one or more displays, speakers, printers, and/or any other output device may be included.

The computing device 120 of the database configuration system may include one or more modules stored in any suitable manner, such as in the memory 104 and/or in the storage 108. As shown in the example of FIG. 1, the storage 108 may contain (or contain a reference to) modules for implementing database configuration system such as a workload module 160, a configuration module 164, cost module 166, and a probability module 168.

The workload module 160 may provide a sample workload 162 as a set of one or more queries sampled from a representative workload, for use in configuring the database system 130. The workload module 160 may determine the set of queries in any suitable manner. In one example, queries may be generated using a query generator which may be a part of or accessed by the workload module 160. In an additional or alternative example, the workload module may access the database system 130 to obtain a representative set of queries 161 that execute against a production version of the database system 130, such as by query tracing. The workload module may provide query tracing or alternatively, the workload module may use a tracing module (not shown) such as Query Patroler available from International Business Machines, SQL Server Profiler available from Microsoft Corporation, ADDM, and the like. One or more queries from the representative workload 161 may be selected by the workload module to be used in the sample workload 162 in configuring the database system.

The configuration module 164 may provide one or more evaluation database configurations 180 for use in configuring the database system 130. A configuration is defined by the set of any combination of tables, indices, and/or views stored in the data store 192 of the database system, and used by the database system in response to user queries. The configuration module may determine the one or more configurations in any suitable manner. For example, a nominal or basis configuration may be determined by communicating with the database system 130 to determine the configuration of the production database system. One or more parameters may be determined, such as a limit on the total size of the configuration on disk, or restrictions on which existing indexes/views may be replaced, which may create a configuration space based on the basis configuration, and the individual indexes and views found helpful to the queries in the sample workload. Additionally or alternatively, a user may specify a basis configuration, a configuration space, or any other suitable set of parameters that may be used by the configuration module to determine one or more database configurations to be used as an evaluation configuration 180.

The cost module 166 receives the configuration workload 162 set of queries and the set of one or more evaluation configurations 180, and based on the received information, determines a cost of the queries. The cost of the queries may be any suitable value or factor indicating a cost or value of the configuration in view of the sample workload set of queries. For example, the cost of the configuration queries may be a time to execute the set of queries given the database configuration. The time to execute may be determined in any suitable manner. For example, the time to execute may be estimated based on heuristics, similar query execution times, and the like. The time to execute may be determined by the cost module itself, or alternatively, the cost module may communicate with an optimizer module 190 of the database system 130 which may provide an execution plan 170 and/or an estimated time to execute 172 the configuration queries given a configuration.

The probability module 168 may determine a probability that one of the evaluation configurations 180 given the sample workload 162 (as a portion of the representative workload 161) is a correct selection for the entire representative workload 162. The probability module then compares the determined probability of correct selection to a target probability threshold α. If the threshold is exceeded, then the probability module returns the evaluation configuration 184 as an optimized database system configuration. As used herein, optimal or optimized means to sufficiently improve. If the threshold is not exceeded, then another configuration may be selected through the configuration module from the configuration space. If a sufficient number of configurations have been tested and the threshold is not exceeded, the database configuration system may then select another, or in one example incrementally add one or more queries to, the sample workload from the representative workload queries to be used to configure the database system.

The determined optimal configuration 184 may then be stored in memory 104 or storage 108 and/or used in any suitable manner. For example, the configuration may be used to modify or configure the database system 130 and/or any other database system, used as a basis for further analysis, and the like.

The database system 130 may be provided by a computing device similar to or different from that described above with reference to the computing device 120. Typically the database system may be implemented by one or more servers, although any suitable computing device may be used. As shown in FIG. 1, the database system 130 may provide a suitable computing environment to execute queries against data stored in the data store 192.

With reference to FIG. 1, an example computing device for providing the services from the database system 130 of the database configuration system 100 includes a computing device, such as computing device 136. In its most basic configuration, computing device 136 typically includes at least one processing unit 132 and memory 134. Depending on the exact configuration and type of computing device, memory 134 may be volatile (such as RAM), non-volatile (such as ROM, flash memory, etc.) or some combination of the two. Additionally, device 136 may also have additional features and/or functionality. For example, device 136 may also include additional storage (e.g., removable and/or non-removable). Such additional storage is illustrated in FIG. 1 by storage 138. Storage 138 may contain the data store 192 and may contain the optimizer module 190 which provides and execution plan and/or cost of executing a specified query against the data store 192.

Device 136 may also contain communication connection(s) 142 that allow the device 136 to communicate with other devices, such as with other computing devices through network 133.

Device 136 may have input device(s) 144 such as keyboard, mouse, pen, voice input device, touch input device, laser range finder, infra-red cameras, video input devices, and/or any other input device. Output device(s) 146 such as one or more displays, speakers, printers, and/or any other output device may be included.

Notation

In the following description, several shorthand notations may be used for clarity. The term Cost(q,C) denotes the cost (such as the optimizer module estimated cost) of executing a query q in a configuration C. For clarity, the present description assumes that the overhead of making a call to the database system optimizer module is constant across all queries. However, it is to be appreciated, as described further below, differences in optimization overhead costs may be incorporated to differentiate between queries.

The total estimated cost of executing a set of N queries $\{q_1, \ldots q_N\}$ in a configuration C is denoted Cost($\{q_1, \ldots, q_N\}$,C) which is also equal to the sum of the cost of executing each query in the set as shown in Equation (1) below:

$$\text{Cost}(\{q_1, \ldots, q_N\}, C) \equiv \sum_{i=1}^{N} \text{Cost}(q_i, C) \quad (1)$$

If the set of queries is the entire representative workload, then the cost of the representative workload may be referred to as the cost of configuration C.

The phrase 'to sample a query' denotes the process of obtaining the query's text from a workload table or file, and evaluating its cost such as by using the optimizer module 190 of the database system 130. The query's text may be retrieved from and/or stored in any suitable location such as in the memory 104 and/or storage 108 of the database configuration system and/or the memory 134 and/or storage 138 of the database system 130. One example query data store is described below with reference to FIG. 4.

The probability of an event A is denoted Pr(A) and the conditional probability of an event A given an event B is denoted Pr(A|B).

Configuring a Database

Figure 2:
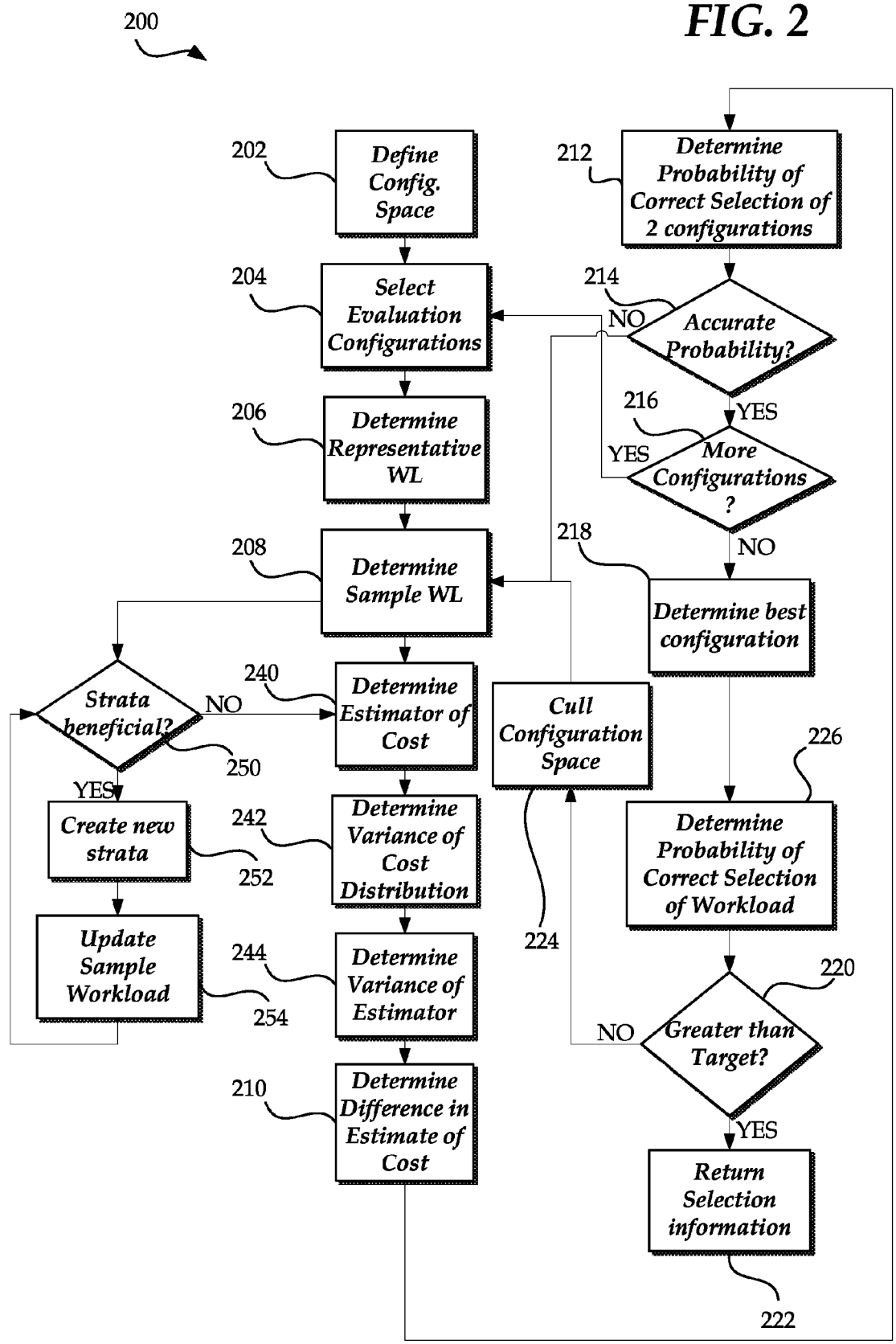
FIG. 2 is flow diagram of an example method of determining an optimal configuration for a database system.

FIG. 2 illustrates an example method 200 of determining a database configuration with independent sampling that may be implemented by the example database configuration system shown in FIG. 1.

The configuration space $C=\{C_1, \ldots, C_K\}$ may be defined 202 in any suitable manner. The configuration module 164 of FIG. 1 may provide the database alternative evaluation configurations for use in configuring the database system 130. The set or plurality of evaluating configurations may be determined in any suitable manner, such as random generation based on one or more basis configurations, current database configurations, heuristics, and the like.

Two evaluation configurations may be selected 204 from the set of representative configurations in any suitable manner such as by estimating which configurations will result in the largest estimated improvement in the probability of a correct selection of a workload, will result in the largest estimated improvement in the sum of the estimator variances (discussed further below), the configurations with the smallest cost, and the like. The selected evaluation configurations may be denoted $C_i$ and $C_j$.

A representative workload, i.e., set of representative queries may be determined 206, such as by the workload module 160 of FIG. 1 and/or by query tracing in the production database system 130. Additionally or alternatively, heuristics, query analysis/generation, and the like may be used to augment and/or cull the traced queries to create a representative set of queries.

One or more queries from the representative workload may be selected to determine 208 the sample workload in any suitable manner. The sample workload is at least a portion of the representative workload to be used in evaluating one configuration against another (i.e., evaluation configurations $C_i$ and $C_j$). Although the representative workload may be compressed using known techniques such as clustering based on a distance function, discussed further in Chaudhuri, et al., Compressing SQL Workloads, Proc. ACM SIGMOD Conference, 2002; based on a query's current costs in view of the current configuration; and the like, the representative workload may be compressed to form the sample workload based on a cost estimate of the selected queries in the evaluation configuration. In this manner, the selected queries of the sampleD configuration may be adapted to the space of configurations analyzed; in contrast to conservative workload compressions which may result in excessive optimizer calls and in contrast to coarse workload compression schemes which may result in inferior database configurations, e.g., physical database designs.

Although the present description of FIG. 2 illustrates an embodiment with independent sampling, any appropriate sampling techniques may be used such as delta sampling, and the like. In independent sampling, the samples used to estimate the cost of each candidate configuration can be chosen independently; in delta-sampling, the same sample is used for every configuration.

In independent sampling, a random sample of n queries may be sampled from the representative workload. The random sample may be selected in any suitable manner. In one example, each query of the representative workload may be associated with a unique query identifier as discussed further below with reference to FIG. 4. A random permutation of the query identifiers may provide a random number associated with each query. Then, such as by using a single scan, the first n queries corresponding to the first n random number identifiers may be sampled, e.g., read into memory and added to the sample workload.

The number of queries to be sampled may be determined in any suitable manner. For example, in the initial iteration, the number of queries initially sampled to form the first sample workload may include a minimum number of queries to ensure applicability of the Central Limit Theorem. The minimum number of queries may be based on heuristics, may be determined as discussed further below with reference to validating assumptions, and the like. It is to be appreciated that in independent sampling, the initial sample of queries in the sample workload may be different for each configuration, whereas for delta sampling, the initial sample is the same for all configurations.

In augmenting an existing sample workload in further iterations (as discussed further below when the probability of correct selection does not meet the target threshold), the next queries and number of queries selected may be selected so that the probability of correct selection Pr(CS) is maximized. In one example, a heuristic approach may be used by attempting to minimize the sum of the estimator variances as an estimate to maximizing the probability of correct selection. In the case of independent sampling, this may lead to increasing the sample workload with k one additional query so that the sum of the estimator variance (i.e., $$\sum_{i=1}^{k} \text{Var}(X_i)$$

is minimized. Since the effect of the next randomly selected query on the sample means and sample variances $S_i^2$ is unknown a priori, the change in the sum of variances may be estimated assuming that these variances remain unchanged. The estimator $X_i$ and the sample variance $s_i^2$ are defined further below in Equations (2) and (6).

Independent sampling may be used to estimate the differences in costs of pairs of configurations, i.e., the selected pair of evaluation configurations $C_i$ and $C_j$. Although determining the estimator of cost and the variance of the cost estimator are described with reference to a single configuration $C_i$, the independent sampling is repeated for each selected evaluation configuration $C_i$ and $C_j$.

An unbiased estimator $X_i$ of the cost of the representative workload WL given a particular evaluation configuration $C_i$, i.e., Cost(WL,$C_i$) may be determined 240 in any suitable manner such as by the cost module of FIG. 1. The unbiased estimator $X_i$ may be determined using:

$$X_i = \frac{N}{|SL_i|} \sum_{q \in SL_i} \text{Cost}(q, C_i) \tag{2}$$

where N is the number of queries in the representative workload WL, $C_i$ is the evaluation configuration, q is selected from the queries in the sample workload $SL_i$, and $|SL_i|$ is the number of queries in the sample workload and sampled from the representative workload WL. In this manner, the estimator of cost $X_i$ is the mean of $|SL_i|$ random variables, scaled up by the total number of queries in the representative workload.

The variance of the underlying cost distribution may be determined 242 in any suitable manner such as by the cost module 166 or the probability module 168 of FIG. 1. For example, the variance $\sigma^2$ of the cost distribution is defined as:

$$\sigma^2 = \frac{\left(\sum_{m=1}^{N} \text{Cost}(q_m, C_i) - \frac{\text{Cost}(WL, C_i)}{N}\right)^2}{N} \tag{3}$$

The variance $\text{Var}(X_i)$ of the estimator may be determined 244 in any suitable manner such as by the cost module 166 or the probability module 168 of FIG. 1. The variance of the estimator is defined as:

$$\text{Var}(X_i) = \frac{N^2}{n} \frac{\sigma_i^2 N}{N-1} \left(1 - \frac{n}{N}\right) \tag{4}$$

where selection is a simple random sample of size n. To simplify the notation of the variance of Equation (4), an interim variable $S_i$ may be defined as:

$$S_i^2 = \frac{\sigma_i^2 N}{(N-1)} \tag{5}$$

However, since evaluating the cost of all queries may be over-burdensome for a large representative workload, the variance of the underlying cost distribution may be estimated in any suitable manner. For example, since the true variance $\sigma_i^2$ is unknown, the variance $\sigma_i^2$ of the cost distribution may be estimated by the sample variances $s_i^2$ to be used in place of the true variance such as in Equations (4) and/or (5). The sample variances $s_i^2$ and $s_j^2$, which are unbiased estimators of the true variances, may be computed for each evaluation configuration in any suitable manner, such as by:

$$s_i^2 = \frac{\sum_{q \in SL_i} \left(\text{Cost}(q, C_i) - \frac{\sum_{q \in SL_i}(\text{Cost}(q, C_i))}{|SL_i|}\right)^2}{|SL_i| - 1} \tag{6}$$

To choose the better of the two evaluation configurations $C_i$ and $C_j$, the true difference in cost $\mu_{i,j}$ between the two evaluation configurations $C_i$ and $C_j$ may be defined as:

$$\mu_{i,j} = \text{Cost}(WL, C_i) - \text{Cost}(WL, C_j) \tag{7}$$

However, as noted above, the overhead of calculating the true cost of the entire workload may be significant. To estimate the difference in costs, the computed estimators $X_i$ and $X_j$ may be used to determine 210 an estimate of the difference in cost between the two evaluation configurations ($C_i$, $C_j$) by differencing the estimated cost for each configuration, i.e., $X_i - X_j$. the difference in the estimate of cost may be determined by the cost module 166 or probability module 168 of FIG. 1.

The probability of correct selection between the two evaluation configurations may be determined 212 in any suitable manner, such as by the probability module 168 of FIG. 1. The unbiased estimator of the difference in costs is a random variable and may be used with the true difference in costs to define a standardized random variable $\Delta_{i,j}$ with a normal distribution, mean of zero, and variance of one ($\sim N(0,1)$) if the sample size is sufficiently large and the Central Limit Theorem holds. Under the large sample size assumption, the random variable $\Delta_{i,j}$ may be defined in independent sampling as:

$$\Delta_{i,j} = \frac{(X_i - X_j) - \mu_{i,j}}{N\sqrt{\frac{S_i^2}{|SL_i|}\left(1 - \frac{|SL_i|}{N}\right) + \frac{S_j^2}{|SL_j|}\left(1 - \frac{|SL_j|}{N}\right)}} \quad (8)$$

The standardized random variable $\Delta_{i,j}$ may be used to determine 212 the probability of making a correct selection between evaluation configurations $C_i$ and $C_j$, which may be denoted as $Pr(CS_{i,j})$.

A decision procedure to choose between the two evaluation configurations may be to select the configuration of the two evaluation configurations which has the smallest estimated cost. In this manner, the probability of making an incorrect selection corresponds to the event that the difference in estimated costs is less than 0 and that the true difference in costs is greater than a sensitivity parameter $\delta$. The sensitivity parameter may be set to any suitable value of 0 and above, and represents the difference in cost between configurations that are desired to be detected. In some cases, setting the value of the sensitivity parameter to greater than 0 may help avoid sampling a large fraction of the representative workload when comparing configurations of 'nearly' (at least within the sensitivity parameter) identical costs. Accordingly, based on the normally distributed variable $\Delta_{i,j}$, the probability of correct selection may be determined using:

$$Pr(CS_{i,j}) = 1 - Pr(X_i - X_j < 0 | \mu_{i,j} > \delta) \quad (9)$$
$$= Pr(X_i - X_j \geq 0 | \mu_{i,j} > \delta)$$
$$\geq Pr(X_i - X_j \geq 0 | \mu_{i,j} = \delta)$$
$$\geq Pr\left(\Delta_{i,j} > \frac{-\delta}{N\sqrt{\frac{S_i^2}{|SL_i|}\left(1 - \frac{|SL_i|}{N}\right) + \frac{S_j^2}{|SL_j|}\left(1 - \frac{|SL_j|}{N}\right)}}\right)$$

In this manner, the probability of correct selection $Pr(CS_{i,j})$ may then be estimated by computing the probability that the variable $\Delta_{i,j}$ is greater than the determined value at the end of Equation (9). Specifically, the right hand side of Equation (9) is computed, and the Normal distribution with known mean and variance of $\Delta_{i,j}$ is compared. In this manner, the probability of a correct selection between the two evaluation configurations may be determined without determining the true difference in costs between the configurations. The probability that the variable $\Delta_{i,j}$ is greater than the determined value may be determined in any suitable manner. For example, assuming that the variable $\Delta_{i,j}$ has a normal distribution of N(0,1), the probability that the variable $\Delta_{i,j}$ is greater than the determined value may be determined using appropriate look-up tables.

The accuracy of the determined probability of correct selection between configurations may be determined 214 such as by the probability module 168 of FIG. 1, and is discussed further below. The accuracy of the estimated probability of Equation (9) may depend on many factors including any combination of having sampled a sufficient number of queries to satisfy the Central Limit Theorem, being able to estimate the true variance $\sigma_i^2$ of the cost distribution, and the like. Since the true variances of the cost distributions are not known, the true variances may be estimated in any suitable manner such as with the sample variances $s_i^2$ of Equation (6).

Since a single very large outlier may dominate both the variance and the skew of the cost distribution, the conditions of meeting the Central Limit Theorem and estimation of the true variance may not be based on the sample alone. In some cases, additional domain knowledge on the cost distribution may be used to verify these conditions, as described further below. In practice, the applicability of the Central Limit Theorem may be evaluated with a heuristic such that the number queries N in the sample workload is at least thirty. However, this heuristic does not determine if the probability of a correct selection $Pr(CS_{i,j})$ between configurations is over- or under-estimated based on the dependence on the sample variances $s_i^2$ and $s_j^2$.

With reference to FIG. 2, if the accuracy of the probability 214 is not sufficient, the method may return to determining a sample workload 208 and selecting a suitable number of additional queries from the representative workload to be added to the sample workload. If the accuracy is sufficient, the method may return to selecting two evaluation configurations 204 until all configurations in the configuration space have been analyzed 216. The selected two evaluation configurations may be two new configurations from the configuration space, or may include one new configuration to be analyzed in conjunction with the better of the two prior selected evaluation configurations $C_i$ and $C_j$.

The best configuration of the evaluation configurations based on the sample workload may be determined 218 in any suitable manner such as by the probability module 168 of FIG. 1. For example, in independent sampling, the configuration with a cost less than that of all other evaluation configurations may be selected as best, given the present sampled sample workload. In this manner, the best configuration $C_{best}$ may satisfy the condition based on its associated estimator $X_{best}$ with respect to all other estimators of other evaluation configurations using:

$$C_{best} \rightarrow X_{best} - X_j < 0; \forall j \neq best \quad (10)$$

For example, consider the case where the configuration $C_i$ is chosen as the best configuration from the representative configurations $\{C_1, \ldots, C_K\}$. The choice of the configuration $C_i$ would be an incorrect choice, if for any $j \neq i$, the difference in costs $X_i - X_j$ is less than 0 and the true difference costs $\mu_{i,j}$ is greater than the sensitivity parameter $\delta$.

The probability of a correct selection of the sample workload $Pr(CS)$ may be determined 226 in any suitable manner, such as by the probability module 168 of FIG. 1. If the configuration space contains only two evaluation configurations, then the probability of correct selection of sample workload $Pr(CS)$ equals the estimated probability between the two configurations $Pr(CS_{i,j})$ as determined in step 212.

In independent sampling, when the number of configurations K in the representative configurations is greater than two, the probability of correct selection of a sample workload is based on the pairwise selection probabilities $Pr(CS_{i,j})$ through all configurations.

An upper bound of the probability of the correct selection of the workload may be determined in any suitable manner to limit the number of iterations through incrementally building the sample workload. For example, the Bonferroni inequality may be used to provide an upper bound to the probability of correct selection of workload value based on the pairwise probability of correct selection between two configurations using:

$$Pr(CS) \geq 1 - \sum_{j \in \{1,\ldots,K\}, j \neq i} (1 - Pr(CS_{i,j})) \quad (11)$$

where $Pr(CS_{i,j})$ is the probability of correct selection between two configurations determined above with respect to Equation (9).

The probability of correct selection of sample workload Pr(CS) may be compared to a target probability threshold $\alpha$. Any suitable value for the target probability threshold a may be used such as 99.9%, 0.995, and the like, and may be set so that the probability of being incorrect by a large amount is small. If the probability of a correct selection of workload does not exceed the target probability threshold $\alpha$, then the method may return to determining a sample workload 208 and selecting a suitable number of additional queries from the representative workload to be added to the sample workload.

In some cases, before returning to determining a sample workload 208, the set of configurations to consider, i.e., the configuration space, may be culled 224 in any suitable manner. For example, a heuristic, which may be appropriate for a large number K of configurations, may include stopping sampling for configurations which are clearly not optimal. Non-optimality of a configuration (no matter what sample workload is used) may be determined in any suitable manner. For example, if a configuration $C_i$ is the chosen configuration in an iteration and $1-Pr(CS_{i,j})$ is negligible (such as $1-\alpha$) for some configuration $C_j$, then the configuration $C_i$ may be culled from future iterations, e.g., culled from the configuration space.

If the target probability threshold $\alpha$ is exceeded, then appropriate selection information may be returned 222. For example, the best configuration with the least estimated cost $X_i$ may be returned as the optimal configuration of the database system. Additionally or alternatively, the sample workload, as a portion of the representative workload may be returned. Additionally or alternatively, the probability of correct selection of workload may be returned, and the like. The selection information may be stored in memory and/or storage, may be displayed to a user through a display device, communicated to another computing device, used to generate a suitable configuration, e.g., generate appropriate indices, views, and the like) for the database system, and the like.

In another example, delta sampling may be used to select one or more queries from the representative workload. Delta sampling is a variation of independent sampling that leverages the stability of the rankings of query costs across configurations to obtain reduction in the variance of the resulting estimator.

As described above with reference to the method 200 of FIG. 2, the configuration space may be defined 202 in any suitable manner. The set of one or more K representative configurations $C = \{C_1, \ldots, C_K\}$ in the configuration space may be generated in any suitable manner within the defined configuration space. For example, one or more representative configurations, e.g., tables, indices, and views, may be defined based on the basis configuration using random generation, heuristics, and the like.

Two evaluation configurations may be selected 204 from the set of representative configurations in any suitable manner. The selected evaluation configurations may be denoted $C_i$ and $C_j$.

A representative workload, i.e., set of representative queries may be determined 206, such as by the workload module 160 of FIG. 1. One or more queries from the representative workload may be selected to determine 208 the sample workload.

To select one or more queries from the representative workload to determine the sample workload, one or more queries from the representative workload may be sampled and may be based on the probability that the workload and/or configuration is the correct selection. Although the present embodiment describes delta sampling, any appropriate sampling techniques may be used. As discussed above, the initial size of the sample workload maybe determined by a minimum number of queries to ensure applicability of the Central Limit Theorem. In augmenting the sample workload in further iterations, the next query may be selected from the representative workload in any suitable manner. For example, the augmentation of a sample workload may be limited to selecting one additional query from the representative workload and noting that each query in the sample workload is evaluated in every configuration in delta sampling, noting that different samples of the workload may be used in independent sampling for each configuration.

In delta sampling, the estimator of cost may be the estimated difference in total cost (e.g., time to compute) between the two evaluation configurations $C_i$ and $C_j$ and may be determined 240 in any suitable manner. For example, the estimator of difference in cost $X_{i,j}$ may be estimated using:

$$X_{i,j} = \frac{N}{|SL|} \sum_{q \in SL} (\text{Cost}(q, C_i) - \text{Cost}(q, C_j)) \quad (12)$$

The selection procedure in selecting the appropriate configuration is to select the configuration $C_i$ from the representative configurations for which the estimated cost difference $X_{i,j}$ is less than zero. The probability of correct selection $Pr(CS_{i,j})$ between two configurations may be determined 212 in any suitable manner. For example, the probability of correct selection between two configurations $Pr(CS_{i,j})$ may be bounded by defining a bounding parameter $\Delta_{i,j}$ which has an approximate Normal distribution with a mean of zero and a variance of one (i.e., ~N(0,1)), and may be defined by:

$$\Delta_{i,j} = \frac{X_{i,j} - \mu_{i,j}}{N\sqrt{\frac{S_{ij}^2}{|SL|}\left(1 - \frac{|SL|}{N}\right)}} \quad (13)$$

assuming that the sample size adheres to the Central Limit Theorem; the true difference in cost $\mu_{i,j}$, and where the notional term $S_{i,j}^2$ may be defined similar to Equation (5) by:

$$S_{i,j}^2 = \frac{N}{N-1}\sigma_{i,j}^2 \quad (14)$$

where the term $\sigma_{i,j}^2$ is the variance of the distribution $\{\text{Cost}(q_k,C_i)-\text{Cost}(q_k,C_j)$ given $k=1,\ldots,N\}$ of the cost-differences between the evaluation configurations $C_i$ and $C_j$.

The variance $\sigma_{i,j}^2$ of the cost distribution may be determined 242 in any suitable manner. The variance of the distribution of the difference in costs $\sigma_{i,j}^2$ is defined by:

$$\sigma_{i,j}^2 = \sigma_i^2 + \sigma_j^2 - 2\,\text{Cov}_{i,j} \quad (15)$$

where $\sigma_i^2$ and $\sigma_j^2$ may be computed using Equation (3) above and $Cov_{i,j}$ is the covariance of the distributions of the query costs of the workload when in evaluated in configurations $C_i$ and $C_j$.

Like independent sampling, the true variance of the cost distribution $\sigma_{i,j}^2$ is unknown and may be estimated in any suitable manner such as with the sample variance defined in Equation (6).

To avoid determining the true difference in cost in evaluating the bounding parameter $\Delta_{i,j}$ of Equation (13), the probability of correct selection between two configurations may rely on the Normal distribution and known mean and variance of the bounding parameter $\Delta_{i,j}$. More particularly, in delta sampling, a decision procedure to choose between the two evaluation configurations may be to select the configuration of the two evaluation configurations where the estimated difference in cost is less than zero (i.e., $X_{i,j}$<0). In this manner, the probability of making an incorrect selection corresponds to the event that the difference in costs is less than 0 and that the true difference in costs is greater than a sensitivity parameter $\delta$. As noted above with respect to the independent sampling, the sensitivity parameter $\delta$ may be set to any suitable value of 0 and above, and represents the difference in cost between configurations that are desired to be detected. Accordingly, based on the normally distributed variable $\Delta_{i,j}$, the probability of correct selection between two configurations may be determined 212 using:

$$Pr(CS_{i,j}) = 1 - Pr(X_i - X_j < 0 | \mu_{i,j} > \delta) \quad (16)$$
$$= Pr(X_i - X_j \geq 0 | \mu_{i,j} > \delta)$$
$$\geq Pr(X_i - X_j \geq 0 | \mu_{i,j} = \delta)$$
$$\geq Pr\left(\Delta_{i,j} > \frac{-\delta}{N\sqrt{\frac{S_{i,j}^2}{|SL|}\left(1 - \frac{|SL|}{N}\right)}}\right)$$

The probability of correct selection $Pr(CS_{i,j})$ between two configurations may then be estimated by computing the probability that the variable $\Delta_{i,j}$ is greater than the determined value at the end of Equation (16). More particularly, the right hand side of Equation (16) may be computed and compared to the variable $\Delta_{i,j}$ based on its known Normal distribution. In this manner, the probability of a correct selection between the two evaluation configurations may be determined without determining the true difference in costs between the configurations. The probability that the variable $\Delta_{i,j}$ is greater than the determined value may be determined in any suitable manner. For example, assuming that the variable $\Delta_{i,j}$ has a normal distribution of N(0,1), the probability may be determined using appropriate look-up tables.

The accuracy of the determined probability of correct selection between two configurations may be determined 214 as described above with respect to independent sampling and Equation (9). If the accuracy of the probability is not sufficient, the method may return to determining a sample workload 208 and selecting a suitable number of additional queries from the representative workload to be added to the sample workload. If the accuracy is sufficient, the method may return to selecting two evaluation configurations 204 until all configurations have been analyzed 216. The selected two evaluation configurations may be two new configurations from the configuration space, or may include one new configuration to be analyzed in conjunction with the better of the two prior selected evaluation configurations $C_i$ and $C_j$.

The best configuration of the evaluation configurations based on the sample workload may be determined 218 in any suitable manner. For example, in delta sampling, the configuration with a cost $x_{i,j}$ less than zero for all evaluation configurations may be selected as best, given the present sampled sample workload. In this manner, the best configuration $C_{best}$ may satisfy the condition based on its associated estimator $X_{best}$ with respect to all other estimators of other evaluation configurations.

The probability of correct selection of a sample workload may be determined 226 in any suitable manner such as by using Equation (11) above. The probability of a correct selection of the present sample workload may be compared to a target probability threshold $\alpha$. Any suitable value for the target probability threshold may be used as noted above with respect to independent sampling. If the probability of a correct selection of configuration does not exceed the target probability threshold, then the method may return to determining a sample workload 208 and selecting a suitable number of additional queries from the representative workload to be added to the sample workload. In some cases, before returning to determining a sample workload 208, the configuration space may be culled 224 in any suitable manner.

If the target probability threshold is exceeded, then appropriate selection information may be returned 222. For example, the best configuration with the least estimated cost $X_{i,j}$ may be returned as the optimal configuration of the database system. Additionally or alternatively, the sample workload, as a portion of the configuration space may be returned. Additionally or alternatively, the probability of correct selection may be returned, and the like. The selection information may be stored in memory and/or storage, may be displayed to a user through a display device, communicated to another computing device, used to generate a suitable configuration, e.g., generate appropriate indices, views, and the like) for the database system, and the like.

In this manner, when the number of configurations K in the representative configurations is greater than two, the probability of correct selection of a configuration is based on the pairwise selection probabilities $Pr(CS_{i,j})$ through all configurations, and selecting the configuration $C_i$ with the smallest estimate $X_{i,j}$. For example, consider the case where the configuration $C_i$ is chosen as the best configuration from the representative configurations $\{C_1, \ldots, C_K\}$. The choice of the configuration $C_i$ would be an incorrect choice, if for any $j \neq i$, the difference in costs $X_i - X_j$ is less than 0 and the true difference costs $\mu_{i,j}$ is greater than the sensitivity parameter $\delta$.

In many cases, delta sampling may out-perform (i.e., provide a better optimized configuration) than independent sampling. This difference in performance or selection of configuration may be based on the differences between the random standardized variable $\Delta_{i,j}$ as computed in Equation (8) for independent sampling and as computed in Equation (13) for delta sampling. The difference in estimator variance between delta sampling and independent sampling depends, at least in part, on the weighted difference between the respective variances, i.e., the difference between the terms $$\frac{S_i^2}{|SL_i|} + \frac{S_j^2}{|SL_j|}$$

for independent sampling and $$\frac{S_{i,j}^2}{|SL|}$$

for delta sampling. Specifically, delta sampling may exploit the variance of the cost difference distribution $\sigma_{i,j}^2$ as defined by Equation (15) above. More particularly, for large workloads, it holds in many cases that, when ranking queries by their costs in the evaluation configurations $C_i$ and $C_j$, the ranks for each individual query do not vary much between configurations. For example, if the cost of a query Q, when evaluated in $C_i$ is higher than the average cost of all queries in $C_i$, its cost when evaluated in $C_j$ is likely to be higher than that of the average query in $C_j$ (and vice versa for below-average costs). For example, a workload may contain both expensive (costly to compute) multi-join as well as simple single-value lookup queries; the multi-join queries will typically be more expensive in both evaluation configurations. If this property holds for most queries, the covariance $Cov_{i,j}$ will be positive, thereby making the variance of the distribution $\sigma_{i,j}^2$ less than the sum of the individual variances (i.e., $\sigma_{i,j}^2 < \sigma_i^2 + \sigma_j^2$). In this manner, if the number of optimizer module calls in estimating the cost of a sample workload given a configuration are roughly equally distributed between configurations in independent sampling, then delta sampling may perform better and result in a righter estimate of the probability of correct selection Pr(CS). Although it is to be appreciated, that independent sampling or any other suitable sampling method may be used as appropriate such as an equal allocation discussed further below. For example. Some configuration-selection tools may not allow queries to be evaluated for all configurations, which may make delta sampling inappropriate.

Stratification of Representative Workload

To further reduce the estimator variances used in determining the probability of a correct selection and/or to further reduce the queries to be analyzed in the sample workload, the queries of the representative workload may be stratified according to an estimate of their cost. Rather than uniformly sampling the representative workload as described above, the queries of the representative workload may be partitioned or separated into different strata. Specifically, the representative workload may be partitioned into L disjunct strata $WL_h$ where $$WL_1 \cup \ldots WL_L = \text{representative WL} \quad (17)$$

The division of the representative WL in the L strata may be based on an estimate of the cost of executing the query(ies) in that stratum. However, the actual cost or even an estimate of the cost of executing the query as determined by the optimizer module 190 of FIG. 1 is unknown (or the computational cost of estimating the query cost with the optimizer is prohibitive). Thus, the estimate of the cost of executing a query in a stratum may be based on an assumption that queries of a particular type as defined by a query template have a similar execution cost. In this manner, the stratifications of queries may be based on the type of query based on a template or skeleton of the query, i.e. queries of the same template are identical in everything but the constant parameters of the query. Any appropriate module, such as the workload module 160 of FIG. 1 may stratify the representative workload.

The sample workload may be determined based on the stratified representative workload. For example, at least one query of every stratum or a selected number of strata may be included in the sample workload. In one example, a different number of queries may be selected from each stratum. The selection of queries from each stratum and selection of a stratum may be based on the estimated cost for that stratum, the variance of costs within the strata, and the like. In one example, the strata which exhibit high variances in actual or estimated cost for the queries in that stratum may be selected at higher rate or number than queries from another stratum, resulting in a lower overall variance. For independent sampling, it may be appropriate to select the configuration and stratum which results in the biggest estimated improvement in the sum of the estimator variances. For delta sampling, a query from the stratum resulting in the biggest estimated improvement in the sum of the variances of all estimators may be chosen and evaluated with every configuration.

While the above described approach of minimizing the estimator variance in selecting the queries for the sample workload and/or the evaluation configurations from the representative configurations assumes that the overhead costs of determining the cost of each query is constant, there may be cases where the time it takes to evaluate the cost of a query for a given configuration (e.g., through a call to the optimizer module) may be different. Accordingly, the differences in time to evaluate the cost of a query may be based on its template by assuming that queries having a similar or identical template will have similar or identical overhead costs in cost evaluation. This difference in overhead cost may be modeled by computing the average overhead for each configuration-stratum pair and selecting the one maximizing the reduction in variance relative to the expected overhead.

In one example, stratification of the representative workload may progress (i.e., add more strata or stratify existing strata in the representative workload) as sampling occurs in determining the probability of a correct selection. As shown in the method of FIG. 2, the sample workload may be determined 208. If stratification of the sample workload is to be considered, the advantageousness of additional strata may be determined 250. Advantageousness of additional strata may be determined in any suitable manner such as in the examples described below. The strata for the representative workload may be determined 252, and the sample workload may be updated 254 based on the sampled queries from at least one of the strata and may include at least one query form each strata.

If additional strata would be beneficial, then the additional strata may be determined in any suitable manner. In one example, additional strata may be determined by allocating the query samples of the representative workload in a number of strata, where the allocation and sample sizes from each strata for the sample workload reduces or minimizes the variance of the estimator of the cost of the configuration ($Var(X_i)$), such as that described with reference to Equation (4) for independent sampling. More particularly, the estimated variance may be computed resulting from each stratification, and then the best stratification may be selected. For example, given strata $WL_h$, where h indexes from 1 to the number of strata L, and a configuration $C_i$, the variance of the cost distribution of the strata $WL_h$ when evaluated in configuration $C_i$ can be denoted by $\sigma_{i(h)}^2$. Similarly, the number of queries in the representative workload N may be replaced with the number of queries in the particular strata h of the representative workload and may be denoted $|WL_h|$. The number of queries to be sampled from the strata $WL_h$ for the sample workload may be denoted $n_h$. In this manner, the variance of the cost $C_i$ for independent sampling may be determined based on Equation (4) above as:

$$\text{Var}(X_i) = \sum_{h=1}^{L} \left(\frac{|WL_h|}{|WL|}\right)^2 \frac{S_{i(h)}^2}{n_h}\left(1 - \frac{n_h}{|WL_h|}\right) \quad (18)$$

In this manner, the allocation of sample sizes (i.e., $n_1, \ldots, n_L$) for the strata may be selected to reduce or minimize the variance as determined by Equation (18) above.

In the case of independent sampling, the same or different stratification may be determined for each configuration $X_i$ to be analyzed. To stratify the representative workload for one configuration $C_i$, as noted above, the costs of queries sharing a template may be assumed to exhibit a smaller variance than the costs of the entire representative workload. Accordingly, it may be possible to estimate the average cost of queries sharing a template using only a few sample queries. In many cases, a rough estimate of the average cost may be sufficient. As a result, the representative workload may be stratified by grouping together queries that share a template. In addition, the average costs for each template may be used to estimate the variance ($S_{i(h)}^2$) of each strata respectively. This does not necessarily mean that using a very fine-grained stratification with a single stratum for every template is the resulting stratification. While a fine grained stratification may result in a small variance for large query sample sizes, the accuracy of the estimate based on the fine grained stratification is based on the assumption that the number of samples $n_h$ sampled from each stratum $WL_h$ is sufficiently large so that the estimator $X_i$ or $X_{i,j}$ of the cost of configuration in each stratum is normal.

If the stratification of the representative workload is based on queries grouped by templates and a sufficiency in sampling in each stratum to augment the assumption that the estimator of the cost of configuration in each strata is normal, then using Equation (18) above, the variance for each stratum may be determined from a stratification ST of L strata indicated by $\{WL_1, \ldots, WL_L\}$ given a sample allocation of queries in each stratum indicated as NT where each allocation in each stratum is indicated by $\{n_1, \ldots, n_L\}$ respectively. Using the variance for each stratum, the number of samples to achieve the target probability of correct selection (Pr(CS)) may be determined. If the finite population correction is ignored, the number of queries to be sampled to achieve the target probability of correct selection (Pr(CS)) can be computed using $O(L \cdot \log 2(N))$ operations by combining a binary search and the Neyman Allocation as described further in Cochran, Sampling Techniques, Wiley Press, 1977, Chap. 5.5, pp. 96-100. The estimate of the number of samples to achieve the target probability of correct selection for a stratification ST and an initial sample allocation NT may be denoted as #Samples(ST,NT).

Stratification of the representative workload may be chosen by maintaining the average costs of the queries in each template and using that average cost to estimate the variance ($S_{i(h)}^2$) of each strata once a small number of queries, such as 10 (although more or less may be appropriate) are initially allocated for each template and can be used to determine the average cost for the template).

Initially, the representative workload has a single stratum, i.e., L=1 and ST=WL. After every sample taken from the representative workload and added to the sample workload, a change in the stratification may be evaluated (e.g., step 250 of FIG. 2). The advantageousness of stratification may be determined by iterating over a set of possible new stratifications $ST_1, \ldots, ST_m$, which may result in splitting one or more of the existing strata into two separate strata. Although the following examples describe splitting a single stratum into two separate strata in a single iteration, it is to be appreciated that any existing stratum may be split into any number of strata either in a single iteration of stratification or iteratively over time. It is to be appreciated that changing the stratification may result in negligible or small computational overhead, as discussed further below.

To determine if the possible new stratification $ST_1, \ldots, ST_m$ is appropriate, the estimate of the number of samples #Samples(ST$_i$,NT) may be computed where NT=$(n_1, \ldots, n_g)$ and each $n_i$ is indexed by the index i which varies from 1 to g, where the number g is the maximum of the number of queries already sampled from the particular stratum i and the minimum number of queries for a normal estimator. In this manner, the value of each $n_i$ may be determined using:

$$n_i = \max(|WL_i|, n_{min}) \quad (19)$$

The minimum number $n_{min}$ of queries for a normal estimator may be determined in any suitable manner and one example is discussed further below. For example, the minimum number of queries may be set by heuristics, observations of the data, user input, and the like.

Figure 3:
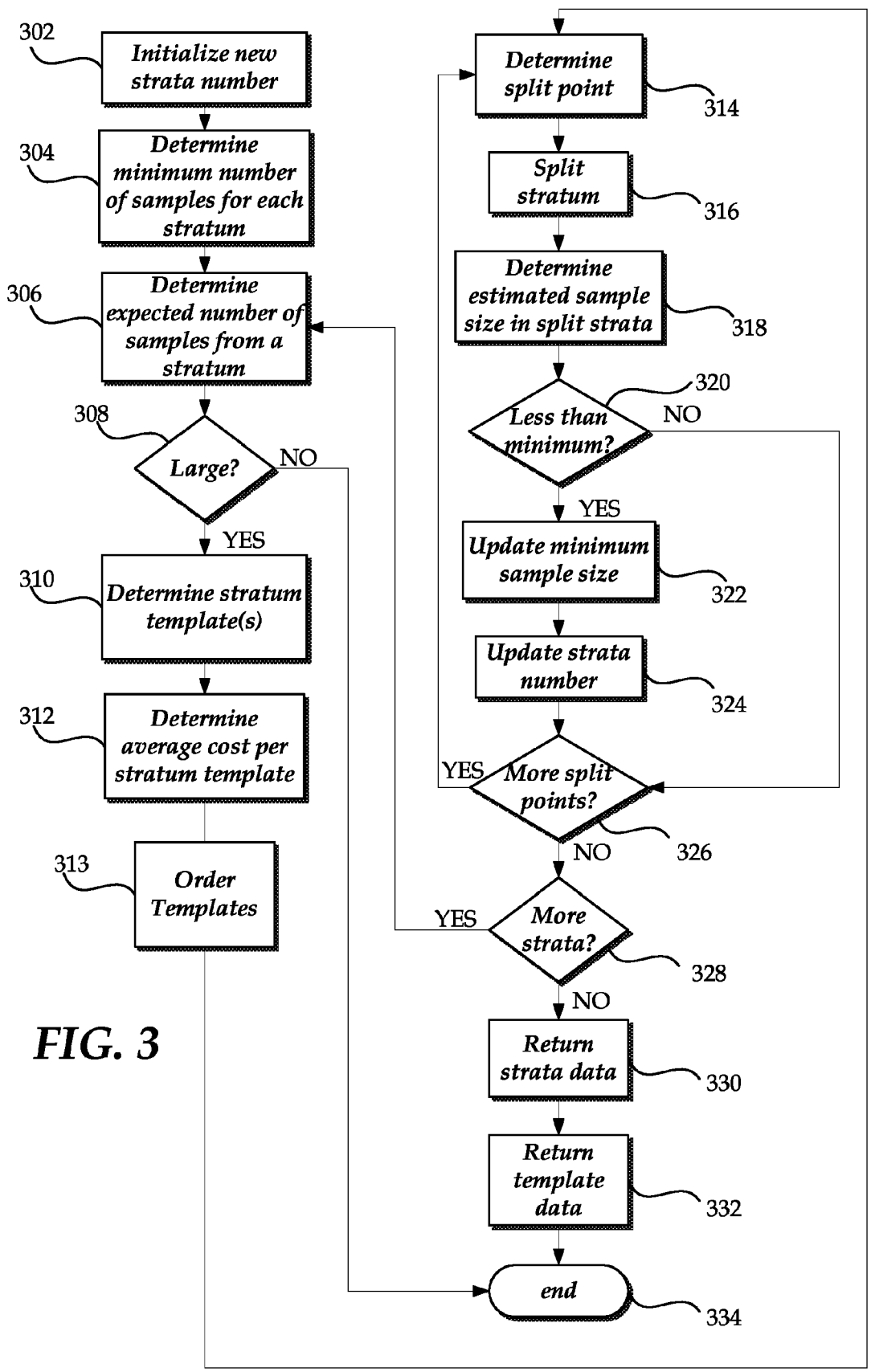
FIG. 3 is a flow diagram of an example method of stratifying a representative workload.

FIG. 3 illustrates an example method 300 of stratifying a representative workload which can be used to determine 250 whether stratification is beneficial, and creating the new stratification 252 of FIG. 2. Although the method 300 is described with reference to independent sampling, the method may be similarly extended to delta sampling as appropriate. The following example describes stratification for a single configuration and may be extended for each configuration to be analyzed in the independent sampling.

The number of strata to be used may be initialized 302 as some number greater than the current number of strata L. For example, the number of strata to be used may be initialized as a variable s and may be initialized using:

$$s = L+1 \quad (20)$$

Which assumes splitting a single stratum into two strata. It is to be appreciated that the current number of strata L in the initial round is one since the representative workload is yet to be further stratified.

The minimum number of samples (i.e., the minimum number of queries to be sampled in each stratum for the sample workload) may be initialized 304 in any suitable manner. For example, the minimum number of samples in each stratum may be initialized to the maximum of the actual number $n_h$ of queries currently sampled from each stratum $WL_h$, and the number of queries $n_{min}$ required for the Central Limit Theorem to apply.

A new stratification may be constructed from an existing stratification by considering splitting each existing stratum $WL_i$ into two strata $WL_i^1$ and $WL_i^2$. As a result, the possible new stratification of $WL_1, \ldots, WL_i^1, WL_i^2, \ldots, WL_L$ may be constructed. For each of these strata, the number of samples required to meet the target probability of correct selection may be determined. The stratification that has the lowest number of estimated samples required to reach the target probability of correct selection Pr(CS) may be selected.

To determine the number of samples required to meet the target probability, the expected number of samples $n_j'$ for each strata $WL_j$ in the existing strata may be determined 306 in any suitable manner for each strata j, which varies from $1, \ldots, L$, of the representative workload. For example, the expected number of samples for each stratum may be computed using a combination of a Binary Search (which iterates over the total number of samples) and the Neyman Allocation which determines how to allocate the samples in the best way and the resulting variance.

Each expected number of samples $n_j'$ may be compared 308 to a stratification threshold to see if it is large, e.g., in need of stratification. Any suitable stratification threshold may be used. For example, the stratification threshold for a large number of samples may be a factor of the minimum number of samples to achieve a normal distribution, such as two times the minimum number of samples $n_{min}$. If each of the numbers of expected samples $n_j'$ is less than the stratification threshold, e.g., not large, then the procedure may end 334 since no strata are in need of stratification, e.g., stratification may not be beneficial.

If at least one of the expected number of samples $n_j'$ is large, then the (set of) templates (also known as a query signatures or skeletons) that make up the queries in stratum j with a large number of expected samples may be determined 310 in any suitable manner. Two queries are considered to have the same template if they are identical except for the constant bindings of their parameters. Query template information can be acquired using any suitable method. For example, the template information may be acquired when the representative workload is determined, such as through a workload collection tool which records template information, parsing the queries in the stratum j, and the like. Parsing of queries requires only a small amount of overhead computational time, when compared to the overhead of optimizing a query.

Figure 4:
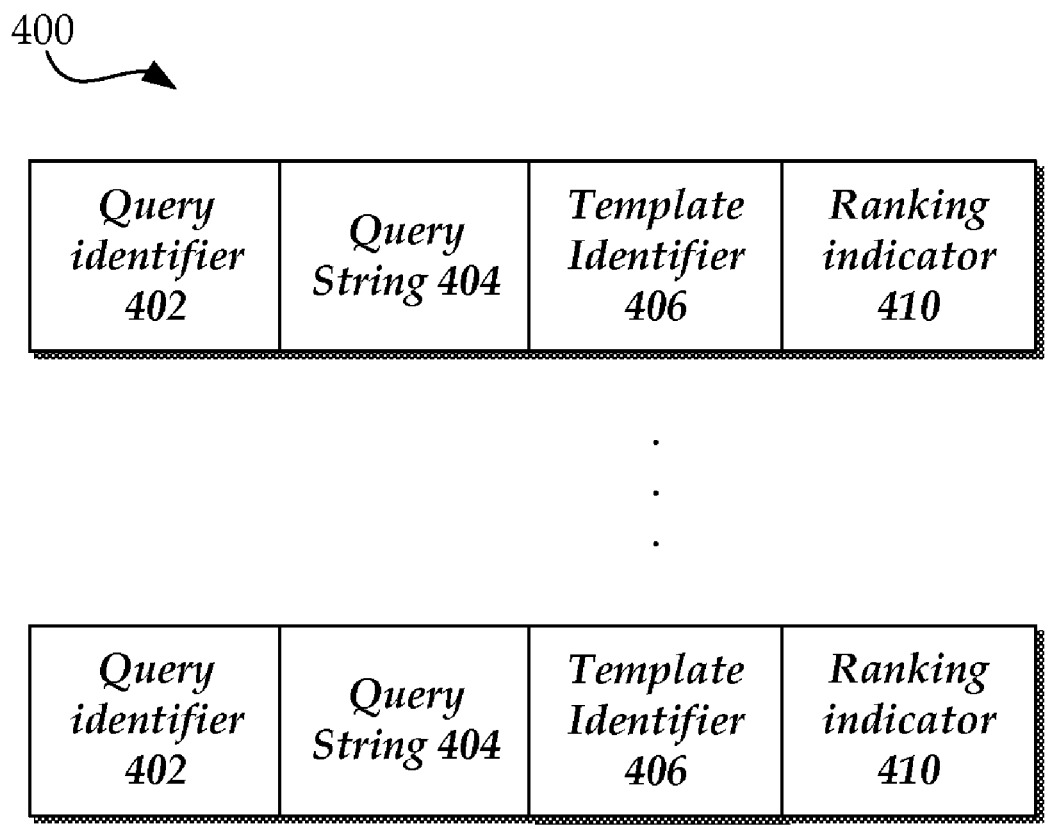
FIG. 4 is a table of an example workload data store.

The template information may be associated with the query information and stored in any suitable manner such as in memory 104 and/or in storage 108 of FIG. 1. In some cases, the query strings of the workload stratum may be too large to fit in memory 104, and thus storage 108 may be used. FIG. 4 illustrates an example data store 400 suitable for storing the associated query information and template information. As shown in FIG. 4, each query may have a query identifier 402 which distinguishes the query from other queries in the representative workload. The query identifier may be associated with a query string 404, which indicates the actual query and may be read from the scan or tracing of the query. The query identifier 402 may be associated with a template identifier 406 which indicates the query template based on the query string. The data store may also associate a ranking indicator 410 with the query identifier which may indicate a ranking of the query in selecting queries from the representative workload. As noted above, the random number may be determined in any suitable manner, such as by random permutation the query identifier 402.

It is to be appreciated that any suitable data store in any suitable format may be used to store and/or communicate the query information, configuration information, probability information, and the like to the database configuration system 100, including a relational database, object-oriented database, unstructured database, an in-memory database, or other data store. A storage array may be constructed using a flat file system such as ACSII text, a binary file, data transmitted across a communication network, or any other file system. Notwithstanding these possible implementations of the foregoing data stores, the term data store and storage array as used herein refer to any data that is collected and stored in any manner accessible by a computing device.

Referring again to FIG. 3, after determining the stratum templates, the average cost per stratum template in the large stratum j may be determined 312 in any suitable manner. For example, one or more sample queries from each template may have their costs determined such as by the optimizer module 190 of FIG. 1. The average cost per template may be determined by averaging the costs for one or more sample queries for each template.

After determining the average cost per template in the large stratum j, the query templates may be ordered 313 by their average costs in any suitable manner. For example, the templates may be ordered in ascending or descending order as appropriate. The ordered average costs may be stored in any suitable manner in memory or storage. For example, the average costs for each template in the stratum j may be stored associated with a template identifier, such as template identifier 406 in the data store 400 of FIG. 4, a template count indicator indicating the count of the templates in the number of templates in the stratum j, and the like. For example, the average cost for each template may be denoted by a template cost indicator, such as $tmp_1, \ldots, tmp_m$ where m indicates the number of templates in the stratum j.

The ordered templates may be examined to determine 314 if any split points are apparent and beneficial to split the stratum j into two or more strata $j_1$, $j_2$, and the like. In one example, the average cost of each template may be examined and a split point may be determined if there is one or more groups of templates $\{tmp_1, \ldots, tmp_t\}$ which have similar average costs and which are different from the remaining group(s) of average costs of query templates $\{tmp_{t+1}, \ldots, tmp_m\}$. In one example, the ordered list of query templates may be separated into two groups of templates, with each group of templates holding the higher of the average costs and the other group holding the lower of the average costs. The stratum j may then be split 316 into two strata $WL_j^1$ and $WL_j^2$ at the split point with the first sub-stratum $WL_j^1$ containing the first group of queries related to the first group of templates $\{tmp_1, \ldots, tmp_t\}$, and the second sub-stratum $WL_j^2$ containing the second group of queries related to the second group of templates $\{tmp_{t+1}, \ldots, tmp_m\}$. In this manner, the current strata $\{W_1, \ldots, W_L\}$ is expanded by a single stratum by splitting the $j^{th}$ stratum into two strata, resulting in a stratification of $\{W_1, \ldots, W_j^1, W_j^2, \ldots W_L\}$ to be considered.

It is to be appreciated that in most cases, all queries associated with a single template identifier remain within a single stratum. Specifically, queries having identical templates may not be separated into different strata. The templates may be ordered by costs only within each single stratum. Specifically, the templates within a single stratum are ordered, but not ordered across multiple strata, since once queries are separated by strata, they may not be combined again.

The estimated sample size to meet the target probability threshold in each of the new strata $\{W_1, \ldots, W_j^1, W_j^2, \ldots W_L\}$ may be determined 318. For example, the estimated sample size with the new split strata at split t may be determined using Equation (21) above as:

$$sam[t] = \#Samples(\{WL_1, \ldots, WL_j^1, WL_j^2, \ldots, WL_L\},$$
$$(n_1, \ldots, n_{min}, n_{min}, \ldots, n_L)) \quad (22)$$

where each of the $n_i$ of Equation (22) is determined as the maximum of the number of queries in that stratum already sampled from the representative workload (i.e., are already in the sample workload) and the minimum number of queries $n_{min}$.

If the estimated sample size sam[t] is less than 320 the minimum number of samples min_sam for each stratum (initialized 304 above), then the minimum number of samples min_sam for each stratum may be updated 322 to equal the estimated sample size in the current possible split sub-stratum sam[t] and the number of strata s may be updated 324 to equal the number of strata t. After updating the strata number, or if the sample size in the split sub-stratum is greater than the minimum number of samples min_sam, then more split points may be examined 326 and the procedure returned to determining another split point 314. If no more split points need to be examined in the stratum $WL_j$, then the representative workload may be examined to determine 328 if more strata $WL_{j+1}$ need to be analyzed. If at least one other stratum needs to be analyzed for potential split, then the procedure returns to determining 306 the expected number of samples from that stratum j+1. If no more strata need to be examined 328, then the best stratification may be determined 330. Specifically, the current number of possible strata s is compared to the initialized number of strata L+1. If the current number of possible strata is greater than the initialized value, then the determined stratification (t) having the minimum number of estimated samples min_sam is selected and replaces the current stratification. If not, the current stratification is used since no examined possible stratification resulted in fewer estimated number of query samples to reach the target probability threshold.

Stratification data may be returned 332. For example, the number of strata, the queries in each stratum, and the average cost per stratum may be returned. Any combination of this or any other stratification data may be stored in the query data store of FIG. 4. Additionally or alternatively, the template data may be returned and may be stored in a template data store. Template data may include any appropriate template information, such as the template format, the queries in each template, the templates in each stratum, the average cost per template, and the like. The procedure may end 334, and return to the method 200 of FIG. 2 and updating 254 the sample workload in view of the new stratification of the representative workload. In this manner, the average costs of the queries in each template may be maintained and used to estimate the variance $S_{i(h)}^2$ once one or more queries have been evaluated for each template and an average cost determined.

The computational overhead of stratifying the representative workload may be evaluated. For example, given T templates in the representative workload WL, there can only be T−1 possible split points over all strata. For each split point, the corresponding value of the number of samples #Samples may be evaluated over the L strata, which as noted above, may include $O(L \cdot \log_2(N))$ operations. As a result, the evaluation of the number of samples may run in $O(L \cdot \log_2(N) \cdot T)$ time. Because the number of different templates is typically orders of magnitude smaller than the size of the entire representative workload, the resulting overhead in evaluating the average costs of templates may be negligible in some cases when compared to the overhead of optimizing even a single query.

Using the method 300 of FIG. 3, all possible stratifications that can be reached from the current stratification by splitting a single stratum are examined. For each possible stratification, the number of samples to reach the target probability threshold is estimated. The stratification with the minimum number of samples is selected and compared to the current stratification of the representative workload. Specifically, the minimum number of samples of the selected possible stratification is lower than the estimated number of samples to reach the target probability of correct selection using the current stratification, and then the selected new stratification is used. In many cases, changing the stratification normally (unless a new stratum has too few queries and must be bumped up to $n_{min}$) does not change the number of queries sampled directly. Rather, the stratification may determine which strata is used as a selection pool for updating the sample workload.

The stratification of the representative workload is described above with reference to independent sampling and may be expanded for delta sampling or any other suitable sampling technique. For example, delta sampling samples the same set of queries for all configurations, and thus a stratification scheme may reconcile the variances of multiple random variables $x_{i,j}$. In the example of delta sampling, the variances of the estimator $X_{i,j}$ can be obtained analogous to that described above. For example, the variances of the stratified estimators $X_{i,j}$ can be obtained by computing the variances of each stratum and summing the estimators of the strata with the variance of each stratum h being weighted by $|WL_h|^2$.

In comparing the stratification schemes, the reduction in the average variance of the estimator $X_{i,j}$ may use:

$$1 \le i \le j \le k \tag{23}$$

where k is the number of configurations under consideration. More particularly, since any stratification affects not only the variance of a specific estimator $X_i$ but all variances when using delta sampling, the reduction in the average variance of all estimators (with the indices meeting the constraints of Equation (23)) may be used.

Furthermore, the ordering of the templates for each estimator $X_{i,j}$, such as described above in operation 313 of FIG. 3, may vary, which may result in up to $k \cdot (k-1)/2$ orderings to consider when computing a new candidate stratification. Thus, in some cases, to limit complexity, only a single ranking over the estimator $X_{i,j}$ may be used.

Verification of Assumptions

Sampling techniques, such as those discussed above, typically rely on one or more factors such as the applicability of the Central Limit Theorem to derive confidence statements for the probability estimates and the sample variance being a sufficient estimate of the true variance of the underlying distribution. In some cases, the typical assumptions of applicability of the Central Limit Theorem and the representation of the overall distribution by the sample may not be valid (e.g., with a highly skewed distribution). In the examples above, the estimation of the probability of a correct selection Pr(CS) relies on the assumptions that (i) a sufficient number of queries are sampled for the Central Limit Theorem to apply and (ii) that the sample variances $s_i^2$ are accurate estimators of the true variances $\sigma_i^2$. While these assumptions may hold true in many cases, the potential impact of choosing an inferior database design if the assumptions are not true may make it desirable to be able to validate the selected configuration to ensure that violation of these assumptions does not lead to selection of a non-optimal configuration.

Figure 5:
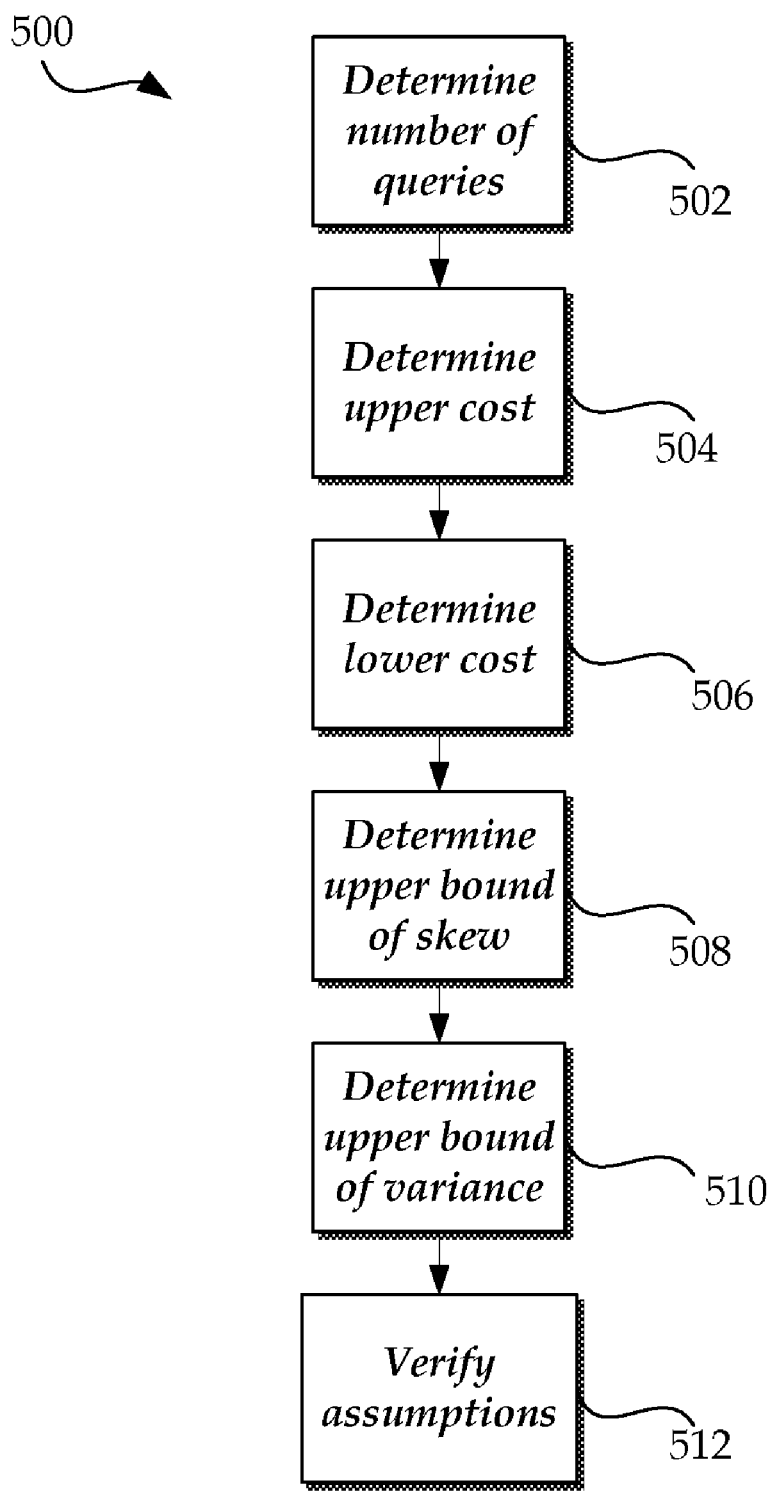
FIG. 5 is a flow diagram of an example method of determining the accuracy of the probability of correct selection of the method of FIG. 2.

The validity of one or more assumptions, and thus the accuracy of the probability of correct selection may be validated in any suitable manner. An example method of determining the accuracy of the probability of correct selection is shown in FIG. 5. In physical database design, the total number of queries in the representative workload may be determined 502, such as by counting the queries in the representative workload. The upper and lower bounds on the individual query costs can be determined 504, 506. Using the total number of queries and the upper and lower bounds of individual query costs, the upper bounds on the skew and/or variance of the underlying distribution may be determined 508, 510 and then used to verify 512 one or both of the assumptions of the applicability of the Central Limit Theorem and the accuracy of the estimated sample variances.

The upper and lower cost bounds may be determined 504, 506 in any suitable manner. For example, the problem of estimating the cost of arbitrary database queries is in many cases hard and is discussed further in Ioannidis et al., Optimal histograms for limiting worst-case error propagation in the size of join results, ACM TODS, Vol. 18, No. 4, December, 1993, pp. 709-748. However, in the context of selecting a database configuration in physical database design, only the bounds on the optimizer estimated cost of queries (and not the true selectivity) are determined. In this manner, the knowledge of the space of physical database design and the optimizer itself may be used to make the problem tractable. Accordingly, the costs may be bound based on the type of query itself. Examples of bounding SELECT-type queries, UPDATE (including INSERT and DELETE statements) type queries are discussed further below, but it is to be appreciated that other query types and/or other query languages may be similarly bounded.

For example, in obtaining bounds on SELECT queries, with automated physical design tools, it may be possible in some cases, to determine an upper bound basis configuration which comprises all or most of the indices and views that will be present in all configurations enumerated during the tuning process. If the optimizer is well behaved, then adding an index or view to the upper bound basis configuration may only improve (or decrease) the optimizer estimated cost of a SELECT-query. As a result, the cost of a SELECT-query in the upper bound basis configuration gives an upper bound on the cost for any configuration enumerated during tuning. In this manner, the upper bound basis configuration may be determined by comparing all of the configurations in the representative configurations and forming an upper bound basis configuration that is an intersection of all of the configurations in the representative configurations.

Lower bounds on the costs of a SELECT-query can be obtained by reversing the method for the upper bound. Specifically, the lower bound on the cost of a query may be determined using a lower bound basis configuration containing all indices and views that may be useful to the particular query. Typical automated physical design tools, e.g., optimizer modules, have components that suggest a set of structures beneficial to the query. For example, if in determining the cost of a query, the optimizer module requests the database system if one or more view sand/or indices are available, then the one or more requested views and/or indices may be made available. However, the number of such structures may be very large. To limit the number of structures, any suitable technique may be used, such as those described further in Bruno et al., Automatic physical database tuning: a relaxation-based approach, ACM SIGMOD conference on Management of Data, 2005, which is incorporated herein by reference. In one example, the optimizer module, such as optimizer module 190 of FIG. 1, may be instrumented with additional code that outputs, for any individual access path considered during optimization of a query, the corresponding index and/or view that would be optimal to support this access path. This may reduce the number of relevant indices and views since which access paths will be relevant is already determined and complex queries may be executed in an extremely large number of different ways and the optimizer module may consider only a subset of the queries.

In obtaining bounds for the costs of UPDATE statements, the complex update statement may be split into a SELECT portion and an UPDATE portion. For example, an UPDATE statement such as UPDATE R SET $A_1=A_3$ WHERE $A_2<4$ may be separated into a SELECT portion of SELECT $A_3$ FROM R WHERE $A_2<4$ and into an UPDATE portion of UPDATE TOP(k) R SET $A_1=0$, where k is the estimated selectivity of the SELECT portion. The SELECT portion of the query may be bounded as described above with respect to SELECT type queries.

To bound the UPDATE portion, any suitable method may be used. For example, heuristics may be used such as noting that in the cost models of queries, such as those of the optimizer module, the cost of a pure update statement grows with its selectivity. Thus, the cost of an UPDATE portion may be bound for a specific template T on a particular configuration C using the optimizer module cost-estimate in the configuration C for at least two queries with the largest and smallest selectivity in the workload that are of template T. In this manner, at least two optimizer module calls (one for the query with the largest selectivity and one for the query with the smallest selectivity) may be made for each template and configuration (unlike when bounding the cost of SELECT queries). The resulting upper and lower cost bounds may then be used for all UPDATE portions having that particular template. This approach may scale well since the number of different templates is generally orders of magnitude smaller than the size of the representative workload.

After determining the upper and lower bounds (i.e., low and high) on the different query types, then the upper and lower bounds for all queries may be determined by summing the respective one or more upper or lower bounds for different query types. Specifically, the upper bound for all query types is the sum of all the individual upper bounds and similarly for the lower bound.

The upper and lower cost bounds on the queries may be used to determine an upper bound on the variance and/or skew. The upper and lower cost bounds may be different for each query 1, although in many cases, the upper and/or lower bounds may be similar or the same for a number of queries.

The upper bound of the variance $\sigma_i^2$ may be denoted $\sigma_{max}^2$. If the upper bound $\sigma_{max}^2$ is used in place of the variance (such as in Equations (5) and (14)), then the resulting estimated value of the probability of a correct selection Pr(CS) will be conservative. The upper bound on the variance may be determined in any suitable manner. For example, the maximum variance may be resolved as a maximization problem with constraints defined by the cost intervals determined from the upper and lower cost bounds as described above. Specifically, given a set of variables $V=\{v_1, \ldots, v_n\}$ which represent individual query costs, with each cost variable $v_i$ being bounded by an individual lower cost bound $low_i$ and by an individual high cost bound $high_i$ (i.e., $low_i \leq v_i \leq high_i$), the upper bound on the variance $\sigma_{max}^2$ may be determined using:

$$\sigma_{max}^2 = \max_{\substack{(v_1,\ldots,v_n) \in R^n \\ \forall i: low_i \leq v_i \leq high_i}} \frac{1}{n} \sum_{i=0}^{n} \left( v_i - \frac{\sum_{i=0}^{n} v_i}{n} \right)^2 \qquad (24)$$

$$\sigma_{max}^2 = \max_{\substack{(v_1,\ldots,v_n) \in R^n \\ \forall i: low_i \leq v_i \leq high_i}} \frac{1}{n} \left( \sum_{i=0}^{n} (v_i)^2 - n \cdot \left( \frac{1}{n} \sum_{i=0}^{n} v_i \right)^2 \right) \qquad (25)$$

However, maximizing Equation (24) may not be solved directly since it is a non-deterministic polynomial in time, and thus intractable. One known algorithm for solving of Equation (24) is described further in Ferson et al., Exact bounds on finite populations of interval data, Technical Report UTEP-CS-02-13d, University of Texas at El Paso, 2002, and requires up to $O(2^n \cdot n^2)$ operations. Thus, the Ferson algorithm may not practical for large representative workload sizes, and as a result intractable for large workloads of n queries.

For large workload sizes or in any other suitable case, the upper bound on the variance may be estimated by determining an upper bound on the upper bound of the variance by discretizing the search space. Specifically, values of the variables $v_i$ may be found and rounded to the nearest multiple of an appropriate chosen factor ρ resulting in rounded variables $v_i^\rho$. The difference between the solution obtained with the rounded variables $v_i^\rho$ and the solution for unconstrained variables $v_i$ may then be bounded.

The maximum estimated value of the left hand portion of Equation (25) $MaxV^2[m][j]$ may be defined as:

$$MaxV_2[m][j] = \max \sum_{i=1}^{m} (v_i^\rho)^2 \qquad (26)$$

where $v_i^\rho$ indicates the rounded variables and Equation (26) is under the constraint of:

$$\sum_{i=1}^{m} (v_i^\rho) = \sum_{i=1}^{m} low_i^\rho + j \cdot \rho \qquad (27)$$

Accordingly, every solution to the maximization of Equation (26) for multiples of ρ may have the form:

$$\frac{1}{n}\left(MaxV^2[n][j] - n \cdot \left(\frac{1}{n}\sum_{i=1}^{m} low_i^\rho + j \cdot \rho\right)^2\right) \qquad (28)$$

And a solution to Equation (26) may be found by examining all possible values of Equation (28).

Since only multiples of ρ are only considered, the upper and lower boundaries of each cost variable $v_i$ may be rounded to multiples of ρ as rounded variables $v_i^\rho$ using:

$$low_i^\rho := \left\lfloor\left(\frac{low_i + \frac{\rho}{2}}{\rho}\right)\right\rfloor \cdot \rho \qquad (29)$$

$$high_i^\rho := \left\lfloor\left(high_i + \frac{\rho}{2}\right)\right\rfloor \cdot \rho \qquad (30)$$

In this manner, each rounded variable $v_i^\rho$ can only take on a specific number $range_i$ of distinct values in the range of:

$$range_i = \frac{(high_i^\rho - low_i^\rho)}{\rho} + 1 \qquad (31)$$

Accordingly, the average of the first m values can take on up to the following number of values:

$$total_m = \left(\sum_{i=1}^{m} range_i\right) - (m-1) \qquad (32)$$

where $total_m$ is the number of different values the average of the first m values can take on. The number of different values $total_m$ may make the approximation of the upper bound of the variance to be scalable, as the values of $total_i$ typically increase much more slowly than the number of combinations of different $high_i$ and $low_i$ values.

All possible values of $MaxV^2[m][j]$ may be determined for $m=1, \ldots, n$ and $j=0, \ldots, total_{m-1}$ using:

$$MaxV^2[i][j+r] = \qquad (33)$$

$$\begin{cases} \max_{r=1,\ldots,total_{i-1}} MaxV^2[i-1][r] + (low_i^\rho + j \cdot \rho)^2 & \text{if } i > 1 \\ (low_i^\rho + j \cdot \rho)^2 & \text{otherwise} \end{cases}$$

Determining the estimate of the upper bound on the left hand value $MaxV^2$ using Equation (33) may take $total_n$ steps from each $i=1, \ldots, n$. Accordingly, the solution to the constrained maximization problem using Equation (28) may be done in $total_n$ steps by iterating over all possible values of j in Equation (28) and selecting the maximum.

The above described determination of the upper bound on the variance may be optimized in any suitable manner. For example, since the second central moment of a distribution has no global maximum over a compact box that is not attained at a boundary point, each rounded variable $v_i^\rho$ may take on only its maximum or minimum value. As a result, only the cases of $j=0$ and $j=total_{m-1}-1$ may be checked in the recurrence of Equation (33). In another additional or alternative example, the number of steps in the algorithm may be reduced by traversing the values of the variables $v_i$ in order of $range_i$ when computing $MaxV^2[m][j]$.

The difference between the approximate solution $\hat{\sigma}_{max}^2$ and the true maximum variance $\sigma_{max}^2$ can be bounded in any suitable manner to determine the accuracy of the approximation of Equation (33). For example, as the difference between each $v_i$ and the closest multiple of ρ is ρ/2, then the difference between the value of the sum of the rounded variances $$\sum_{i=0}^{n} (v_i^\rho)^2$$

and the value of the sum of the actual variances $$\sum_{i=0}^{n} (v_i)^2 \text{ in } \sigma_{max^2}$$

is at most $$\sum_{i=0}^{n} (\rho \cdot v_i^\rho + \rho^2/4).$$

Similarly, the difference between $$n \cdot \left(\frac{1}{n}\sum_{i=0}^{n} v_i^\rho\right)^2$$

and $$n \cdot \left(\frac{1}{n}\sum_{i=0}^{n} v_i\right)^2$$

is also at most $$\sum_{i=0}^{n} (\rho \cdot v_i^\rho + \rho^2/4).$$

In this manner, the difference between the variance of a set of values $v_1, \ldots, v_n$ and the variance of the rounded variables of $v_1^\rho, \ldots, v_n^\rho$ created by rounding the variables $v_i$ to the nearest multiple of $\rho$ is bounded by the variable $\theta$ which is defined by:

$$\theta = \frac{2}{n}\sum_{i=0}^{n} (\rho \cdot v_i^\rho + \rho^2/4) \qquad (34)$$

In this manner, the existence of a solution $\sigma_{max}^2$ to the unconstrained problem implies the existence of a set of variables $v_1^\rho, \ldots, v_n^\rho$ of multiples of the value $\rho$, where for all indices i, each variable $v_i^\rho$ being greater than or equal to the respective lower bound of $low_i^\rho$ and less than or equal to the respective higher bound of $high_i^\rho$ and the corresponding variance lower bounded by $\sigma_{max}^2 - \theta$. The opposite holds true as well. Specifically, the existence of a set of rounded variables $v_1^\rho, \ldots, v_n^\rho$ of multiples of the value $\rho$, where for all indices i, each variable $v_i^\rho$ being greater than or equal to the respective lower bound of $low_i^\rho$ and less than or equal to the respective higher bound of $high_i^\rho$, that has a variance $\hat{\sigma}_{max}^2$ implies the existence of a set of variables $v_1, \ldots, v_n$, where for all indices i, each variable $v_i$ being greater than or equal to the respective lower bound of $low_i$ and less than or equal to the respective higher bound of $high_i$, and whose corresponding variance is bounded by $\hat{\sigma}_{max}^2 - \theta$. As a result, the difference between the exact solution $\sigma_{max}^2$ and the approximate solution $\hat{\sigma}_{max}^2$ is bounded by the variable $\theta$ as determined by Equation (34).

The determined approximate solution $\hat{\sigma}_{max}^2$ may be compared to the sample variances $s_i^2$ in any suitable manner. For example, the difference between the sample variances and the approximate solution may be compared to a variance threshold value. Any suitable variance threshold value may be used as appropriate. If the variance threshold value is exceeded, then any appropriate action may be taken. For example, an uncertainty or risk indicator may be associated with the determined database configuration, the configuration may be further tuned, and the like.

In operation, the above check on the variance may be scalable even for large representative workloads. For example, the overhead of time to compute the approximate solution $\hat{\sigma}_{max}^2$ for a TPC-D representative workload containing one hundred thousand queries and various values of the multiple $\rho$ may be determined for a processor. As a result, the time to compute the approximate solution $\hat{\sigma}_{max}^2$ may be approximately 0.4 seconds for a multiple $\rho$ having a value of 10, 5.2 seconds for a multiple $\rho$ having a value of 1, and 53 seconds for a multiple $\rho$ having a value of 0.1, on a Pentium 4 (2.8 GHz) processor. It is to be appreciated that any suitable value for the multiple $\rho$ may be selected considering the accuracy for the approximations, computational time, and the like.

The validation of the applicability of the Central Limit Theorem may also be useful since that may be assumed in sampling queries in modeling the probability of the correct selection. Accordingly, the minimum number of samples to ensure a valid assumption (i.e., $n_{min}$ discussed above with respect to stratification) may be determined in any suitable manner. In one example, Cochran's rule may be used which is described further in Cochran, Sampling Techniques, Wiley Series in Probability and applied Statistics, Wiley, 1977, pages 39-45. Cochran's rule states that for populations marked by positive skewness (i.e., the population contains significant outliers), the sample size $n_{min}$ should satisfy $s>25$ $(G_1)^2$, where $G_1$ is Fisher's measure of skew. Under the assumption that the disturbance in any moment higher than the third moment, is negligible (and additional conditions) on the sampling fraction f defined by 1−n/N), then the condition on the minimum number of samples $n_{min}$ may guarantee that a 95% confidence statement will be wrong no more than 6% of the time.

Cochran's rule may be applied in any suitable manner to random sampling, such as sampling queries from a representative workload. Although the following description applies a variation of Cochran's rule of $$n > 28 + 25 \cdot (G_1)^2 \qquad (35)$$

it is to be appreciated that other variations and applications of Cochran's rule may be used and may depend on the size of the representative workload. Other variations of Cochran's rule are discussed further in Sugden et al., Cochran's rule for simple random sampling, J. Royal Statistical Society, No. 2, Part 4, 2000, pp. 787-793. To verify the condition, such as that of Equation (35), the upper bound on the skew $G_{1max}$ may be determined.

The upper bound on the skew may be determined in any suitable manner. For example, like the upper bound on the variance, the upper bound of the skew may be resolved as a maximization problem with constraints defined by the cost intervals. Specifically, given a set of variables $V=\{v_1, \ldots, v_n\}$ which represent query costs, with each variable $v_i$ being bounded by the determined individual lower cost bound $low_i$ and by the determined individual high cost bound $high_i$ (i.e., $low_i \leq v_i \leq high_i$), the upper bound on the skew $G_{1max}$ may be determined using:

$$G_{1max} = \max_{\substack{(v_1,\ldots,v_n) \\ \forall i: low_i \leq v_i \leq high_i}} \frac{\sum_{i=0}^{n}\left(v_i - \frac{\sum_{i=0}^{n} v_i}{n}\right)^3}{\left(\sum_{i=0}^{n}\left(v_i - n\frac{\sum_{i=0}^{n} v_i}{n}\right)^2\right)^{3/2}} \qquad (36)$$

The value of the upper bound for the skew $G_{1max}$ of Equation (36) may be approximated in any suitable manner. For example, an upper bound to the upper bound $G_{1max}$ may be determined similar to the upper bound of the variance by solving a restricted version of the original problem in which each value of a variable $v_i^k$ is rounded to a multiple of a constant k and bounded by a lower bound $low_i^k$ and bounded by an upper bound $high_i^k$. The lower bound for the rounded variables may be determined in any suitable manner. For example, the upper and lower bounds of the rounded variables may be determined using:

$$low_i^k = \left\lfloor \frac{\left(low_i + \frac{k}{2}\right)}{k} \right\rfloor \cdot k \quad (37)$$

$$high_i^k = \left\lfloor \frac{\left(high_i + \frac{k}{2}\right)}{2} \right\rfloor \cdot k \quad (38)$$

The number of discrete values that the variables $v_i^k$ may take on may be within $range_i$ which may be determined using:

$$range_i = \frac{(high_i^k - low_i^k)}{k} + 1 \quad (39)$$

The number of distinct values that the sum of the variables (i.e., $v_1^l + \ldots + v_n^k$) may take on may be indicated as $total_m$ which may be determined as:

$$total_m = \left(\sum_{i=1}^{m} range_i\right) - (m - 1) \quad (40)$$

The decomposition strategy for the skew $G_{1max}$ may be determined in any suitable manner and may be more involved than that for the variance described above. For example, a list of L entries of the variable MaxX³ [m][j₁][j₂] may be maintained. The variable MaxX³ [m][j₁][j₂] may be determined in any suitable manner such as by determining the maximum value under constraints using:

$$MaxX^3[m][j_1][j_2] = \max \sum_{i=1}^{m} (v_i^k)^3 \quad (41)$$

and being constrained by:

$$\sum_{i=1}^{m}(v_i^k) = \sum_{i=1}^{m} low_i^k + j_1 \cdot k \quad (42)$$

$$\sum_{i=1}^{m}(v_i^k)^2 = \sum_{i=1}^{m}(low_i^k)^2 + j_2 \cdot k \quad (43)$$

The value of the variable MaxX³ [m][j₁][j₂] may be initialized in any suitable manner, such as by determining:

$$MaxX^3[1][j_1][(j_1)^2+2(j_1)\cdot low_i^k]=(low_i^k+j_1\cdot k)^3 \quad (44)$$

for $j_1=0, \ldots, range_i-1$. The value of the variable MaxX³ [m][j₁][j₂] may be updated in any suitable manner such as by using the recursion:

$$MaxX^3[i][j_1 + c][j_2 + c^2 + 2 \cdot c \cdot low_i^k] = \quad (45)$$
$$\max_{\substack{c=1,\ldots,total_{i-1} \\ MaxX^3[i-1][j_1'][j_2'] \in L}} MaxX^3[i][j_1'][j_2'] + (low_i^k + c \cdot k)^3$$

Using Equation (36) above, the skew $G_1$ of a distribution of variables $V = \{v_1, \ldots, v_n\}$ may be determined using:

$$G_1 = \frac{A - B}{C} \quad (46)$$

$$A = \sum_{i=1}^{n}(v_i)^3$$

$$B = \frac{3}{n}\sum_{i=0}^{n} v_i \sum_{i=0}^{n}(v_i)^2 - \frac{3}{n^2}\left(\sum_{i=0}^{n} v_i\right)^2 \sum_{i=0}^{n}(v_i) + \left(\sum_{i=0}^{n}\frac{v_i}{n}\right)^3$$

$$C = n \cdot \left(\sum_{i=0}^{n}(v_i)^2 - n \cdot \left(\sum_{i=0}^{n} v_i\right)^2\right)^{3/2}$$

Specifically, the values of variables V1 and V2 determine the variables B and C respectively of Equation (46) where the variables of V1 and V2 are defined by:

$$V1 = \sum_{i=1}^{m}(v_i) \quad (47)$$

$$V2 = \sum_{i=1}^{m}(v_i)^2$$

In this manner, by maximizing the variable V3 which determines the variable A of Equation (46), then the value of $G_1$ of Equation (46) may also be maximized, where the variable V3 is determined by:

$$V3 = \sum_{i=1}^{m}(v_i)^3 \quad (48)$$

Using an argument similar to the one used in the approximation of the variance described above, a valid assignment of value $v_i$ for $i=1, \ldots, n$, with a value of σ' for the variable B in Equation (46) implies the existence of a valid assignment $v_i^k$, $i=1, \ldots, n$ in the constrained problem, whose value for the variable B differs from σ' at most by the variable θ, where the variable θ is defined by:

$$\theta = 2\sum_{i=0}^{n}\left(k \cdot v_i^k + \frac{k^2}{4}\right) \quad (49)$$

Using a similar argument, the difference between variables A and B in the numerator of Equation (46) can be bound by the variable Θ using:

$$\Theta = 2 \cdot k^3 + 3k^2 \cdot \sum_{i=0}^{n} v_i^k + 6k \cdot \sum_{i=0}^{n} (v_i^k)^2 \qquad (50)$$

Since the Central Limit Theorem converges fairly quickly, even rough bounds derived as above may allow a formulation of practical constraints on sample size. For example, for a highly skewed (e.g., query costs may vary by multiple degrees of magnitude) workload having 13,000 queries, then the satisfaction of Equation (35) above may take approximately a 4% sample size. In another example, for a 131,000 thousand query representative workload, less than 0.6% of the queries may be needed to satisfy the constraint of Equation (35).

Figure 6:
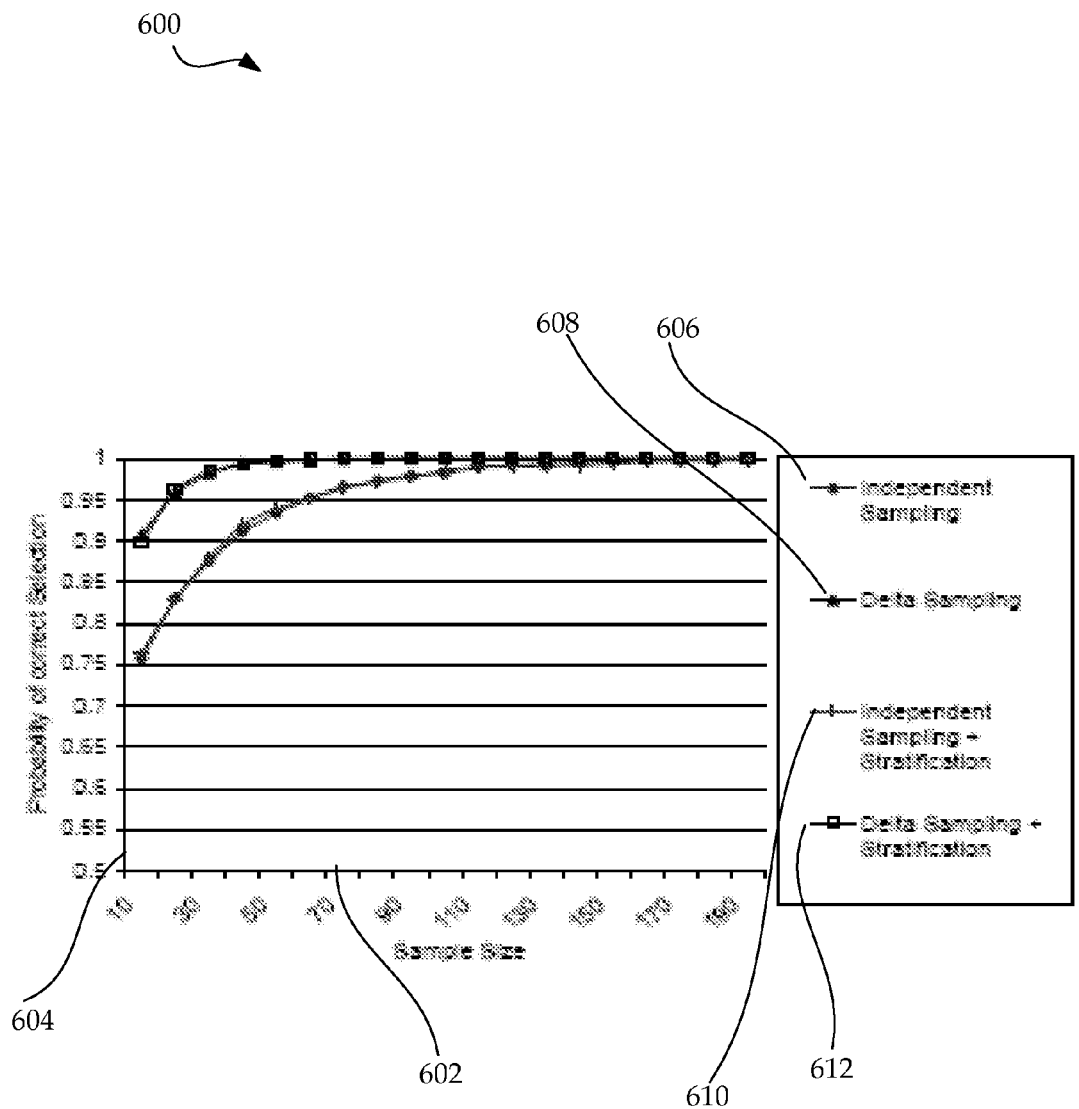
FIG. 6 is a chart of an example Monte Carlo simulation of the probability of correct selection for a synthetic workload.
Figure 7:
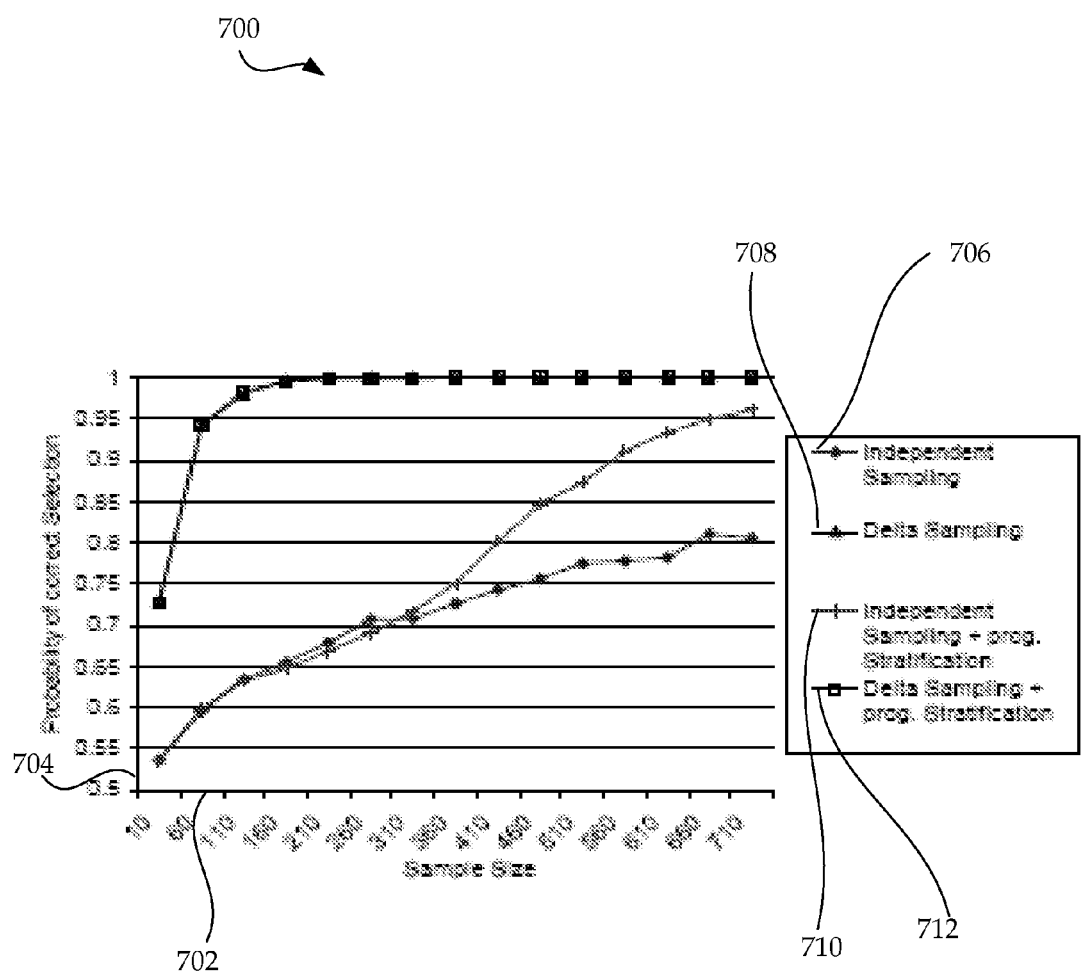
FIG. 7 is another chart of an example Monte Carlo simulation of the probability of correct selection for a synthetic workload.
Figure 8:
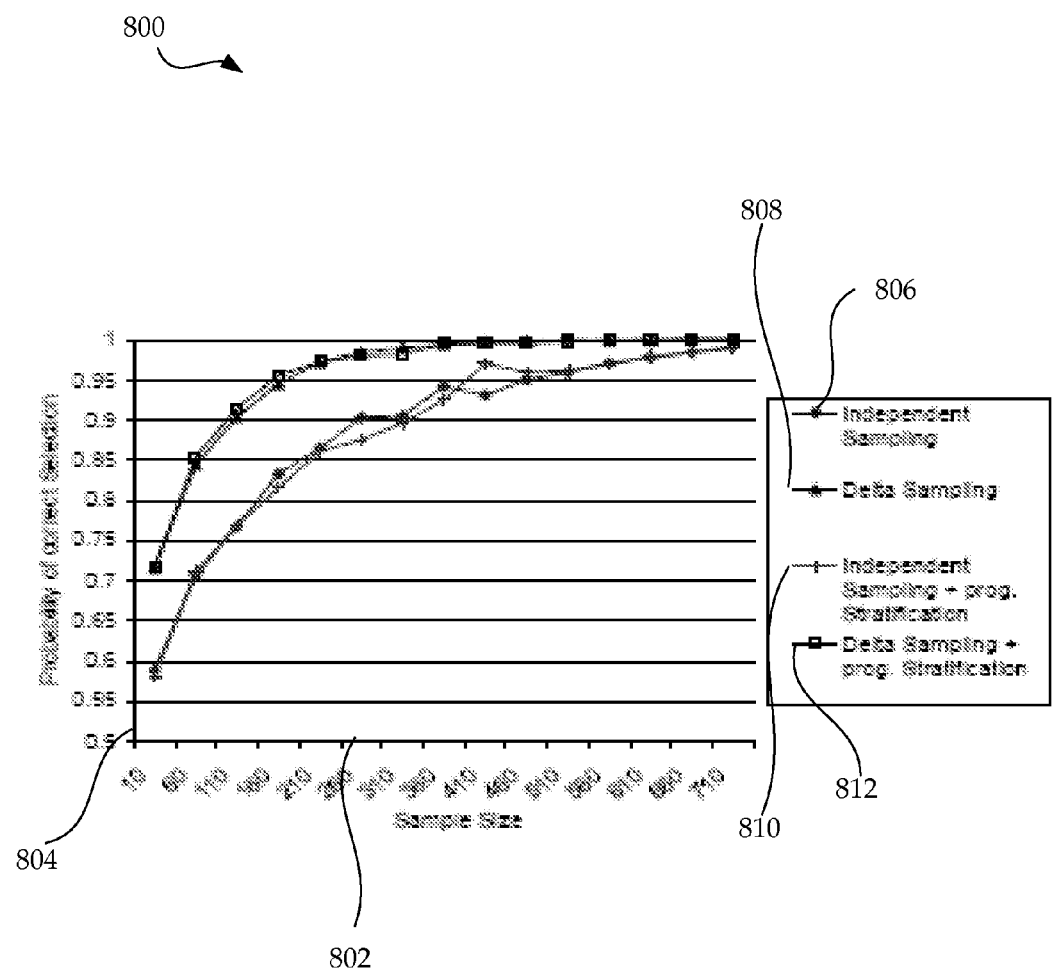
FIG. 8 is a chart of an example Monte Carlo simulation of the probability of correct selection for a real workload.

FIGS. 6-8 illustrate example estimations of the probability of a correct selection. For the data illustrated in FIGS. 6-8, the estimation was run on a Pentium 4 (2.8 GHz) computing device running Windows Server 2003® available from Microsoft Corporation of Redmond, Wash., and using cost modeling available from a commercial database management system. The results are shown for two different databases, one synthetic and one real-life. The synthetic database follows the TPC-D schema and was generated so that the frequency of the attribute values follows a Zipf-like distribution, using the skew-parameters of θ=1. The total data size for the synthetic database is approximately 1 GB and the representative workload contained approximately 13,000 queries, generated using the QGEN tool. The real-life database is based on a database running on a CRM application with over 500 tables and having a size of approximately 0.7 GB. The representative workload was obtained for the real-life database using a trace tool. The resulting representative workload contained about 6,000 queries, including inserts, updates, and deletes.

The efficiency of the independent and delta sampling techniques described above are compared in FIGS. 6-8 both with and without progressive stratification. FIG. 6 illustrates the TPC-D synthetic workload and considers the problem of choosing between two configurations $C_1$ and $C_2$ that have a significant difference in cost (7%) and in their respective sets of physical design structures (i.e., configuration $C_2$ is index only with no views, and configuration $C_1$ contains a number of views in addition to some indices). Since the representative workload |WL| contains ~13,000 queries, solving the configuration-selection problem exactly requires ~26,000 calls to determine the query costs (such as calls to the optimizer module). As a result, to determine with 100% confidence that the best configuration is selected, approximately 26,000 optimizer calls will need to be made. However, if probabilistic bounds using the above described techniques are acceptable, then the acceptable configuration may be selected with only a small fraction of that number of optimizer calls. For example, the probabilistic method to determine the optimal configuration between $C_1$ and $C_2$ 5,000 times for a sensitivity parameter δ=0, resulting in a Monte Carlo simulation to compute the 'true' probability of correct selection for a given number of samples. The results of the Monte Carlo simulation are illustrated in the graph 600 of FIG. 6. The graph 600 plots the sample size along axis 602 and the probability of correct selection along axis 604. The results of independent sampling without stratification are shown in line 606; the results of delta sampling without stratification are shown in line 608; the results of independent sampling with stratification are shown in line 610; and the results of delta sampling with stratification are shown in line 612. As shown in FIG. 6, the sampling-based approach to configuration selection may be efficient with less than 1% of the number of optimizer calls and still resulting in a sufficient selection of the correct configuration with near-certainty. Delta-sampling may outperform independent sampling, especially for smaller sample sizes, whereas adding progressive stratification may make little difference, when given small sample sizes.

FIG. 7 illustrates the same TPC-D synthetic workload and considers the problem of choosing between two configurations $C_1$ and $C_2$ that have a smaller difference in cost (<2%) and in their respective sets of physical design structures (i.e., configurations $C_1$ and $C_2$ both are index only with no views). The correct configuration between $C_1$ and $C_2$ was then determined multiple times (i.e., approximately 5,000 times) for a sensitivity parameter δ=0, resulting in a Monte Carlo simulation to compute the 'true' probability of correct selection for a given number of samples. The results of the Monte Carlo simulation are illustrated in the graph 700 of FIG. 7. The graph 700 plots the sample size along axis 702 and the probability of correct selection along axis 704. The results of independent sampling without stratification are shown in line 706; the results of delta sampling without stratification are shown in line 708; the results of independent sampling with stratification are shown in line 710; and the results of delta sampling with stratification are shown in line 712. As shown in FIG. 7, the delta sampling outperforms independent sampling by a larger margin than that shown in FIG. 6 since the configurations share a large number of objects, which results in higher covariance between the cost distributions. Because of the larger sample sizes illustrated along axis 702, stratification improves the accuracy of independent sampling as shown in FIG. 7.

FIG. 8 illustrates the real-life workload and considers the problem of choosing between two configurations $C_1$ and $C_2$ that have a smaller difference in cost (<1%) and a large difference in their respective sets of physical design structures. The correct configuration between $C_1$ and $C_2$ was then determined multiple times (i.e., 5,000 times) for a sensitivity parameter δ=0, resulting in a Monte Carlo simulation to compute the 'true' probability of correct selection for a given number of samples. The results of the Monte Carlo simulation are illustrated in the graph 800 of FIG. 8. The graph 800 plots the sample size along axis 802 and the probability of correct selection along axis 804. The results of independent sampling without stratification are shown in line 806; the results of delta sampling without stratification are shown in line 808; the results of independent sampling with stratification are shown in line 810; and the results of delta sampling with stratification are shown in line 812. As shown in FIG. 8, the delta sampling only slightly outperforms independent sampling since the configurations are quite different. Moreover, the real-life representative workload contained a relatively large number of distinct templates, (i.e., greater than 100). Accordingly, estimates of the average costs of all templates were rarely determined, so progressive stratification partitioned the workload in only a few cases.

Figure 9:
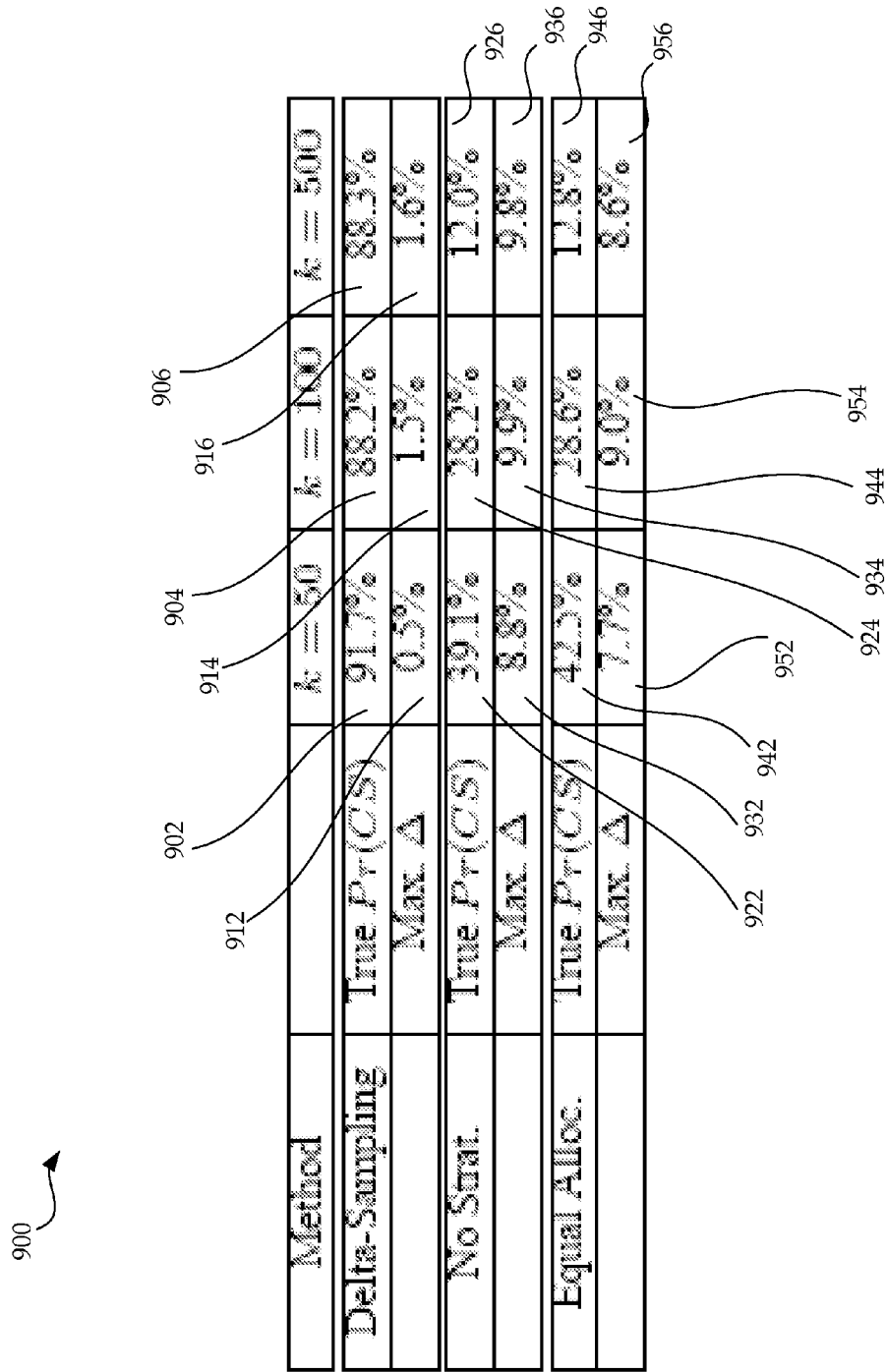
FIG. 9 is a table containing results of a Monte Carlo simulation of the probability of correct selection for different sampling techniques for a synthetic workload and various numbers of evaluation configurations.
Figure 10:
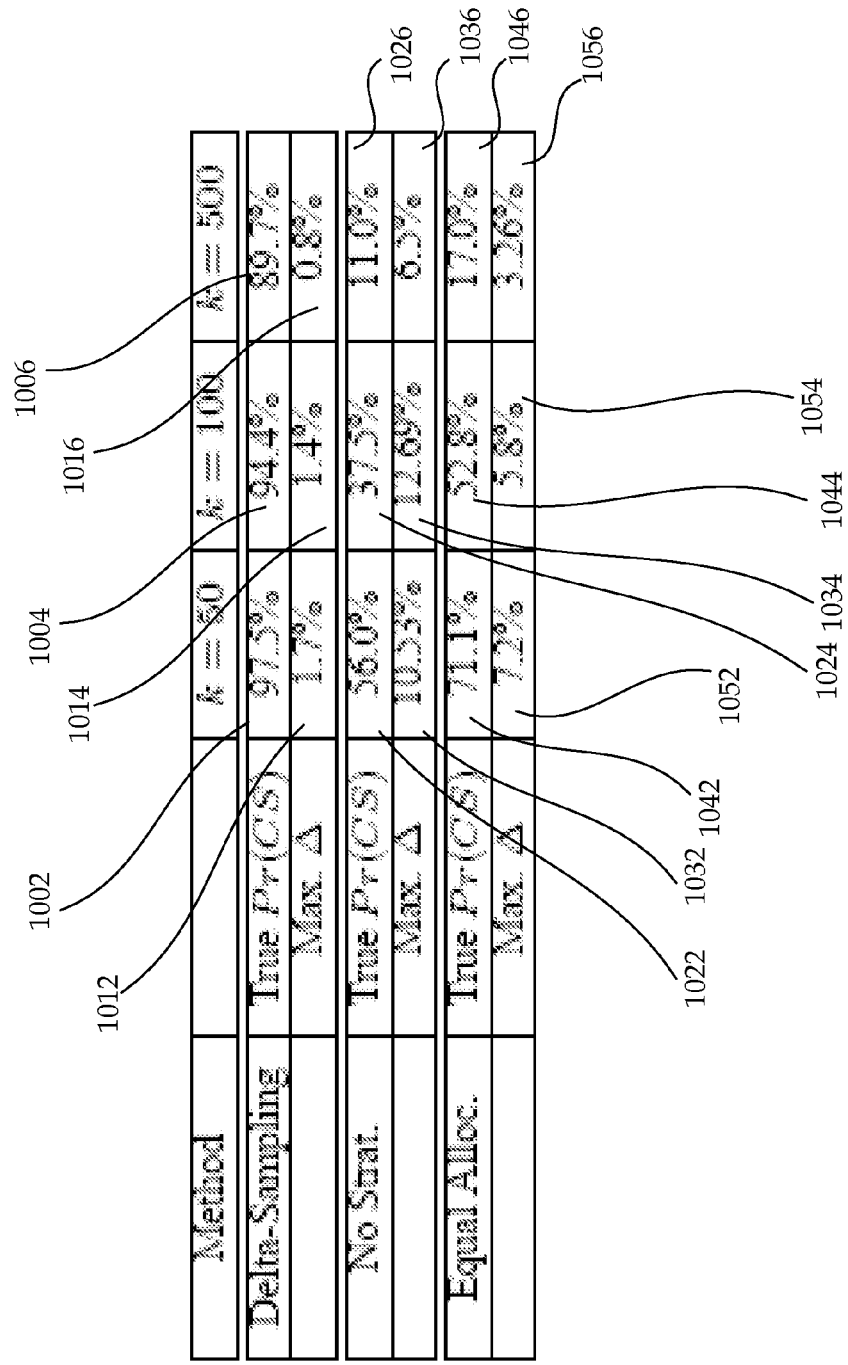
FIG. 10 is a table containing results of a Monte Carlo simulation of the probability of correct selection for different sampling techniques for a real workload and various numbers of evaluation configurations.

The comparison primitive based on determining the probability of correct selection for large numbers of configurations k with Delta sampling and progressive workload stratification may be compared to alternative sample-allocation methods using an identical number of samples. The first alternative allocation method was evaluated without workload stratification, and a second allocation method was evaluated by sampling the same number of queries from each stratum. In the example shown in FIGS. 9 and 10, the delta-sampling example was determined with a target probability threshold α of 90% and a sensitivity parameter δ of zero. In these examples, the sample variances $s_i^2$ were used to estimate the true variance $\sigma_i^2$. In order to guard against potential oscillation of the Probability of correction selection estimates, the probability of correct selection (Pr(CS)) was accepted if the probability held greater than the target probability threshold for more than a number of iterations defined by an iteration threshold. Any suitable number of iterations to ensure stability may be used, such as approximately 10 consecutive samples. As an additional optimization, sampling from configurations $C_j$ may be stopped for which the contribution to the overall uncertainty in the probability of correct selection is small or negligible (i.e., the representative workload may be culled). In the examples of FIGS. 9 and 10, a small contribution to uncertainty was determined at a probability of correct selection greater than 0.995 (i.e., $Pr(CS_{i,j})>0.995$—since in this case configuration $C_i$ is better than $C_j$ and can hence throw out $C_j$.

The tables of results of FIGS. 9 and 10 show the resulting probability of selecting the best configuration ('true' Pr(CS) and the maximum difference in cost between the actual best configuration and the one selected by each method (Max Δ). The maximum difference in cost may allow assessment of the worst-case impact of using the alternative techniques of sampling. Each example was repeated approximately 5,000 times to simulate a Monte Carlo result to estimate the 'true' probability of correct selection.

FIG. 9 illustrates a table 900 indicating the results for the synthetic TPC-D workload. The delta sampling determined probability of correction selection is shown at value 902 for 50 representative configurations, at value 904 for 100 representative configurations, and at value 906 for 500 representative configurations. The delta sampling maximum difference in cost of the selected configuration is shown at value 912 for 50 representative configurations, at value 914 for 100 representative configurations, and at value 916 for 500 representative configurations. The delta sampling with no stratification determined probability of correction selection is shown at value 922 for 50 representative configurations, at value 924 for 100 representative configurations, and at value 926 for 500 representative configurations. The delta sampling with no stratification maximum difference in cost of the selected configuration is shown at value 932 for 50 representative configurations, at value 934 for 100 representative configurations, and at value 936 for 500 representative configurations. The equal allocation alternative sampling determined probability of correction selection is shown at value 942 for 50 representative configurations, at value 944 for 100 representative configurations, and at value 946 for 500 representative configurations. The equal allocation alternative sampling maximum difference in cost of the selected configuration is shown at value 952 for 50 representative configurations, at value 954 for 100 representative configurations, and at value 956 for 500 representative configurations.

FIG. 10 illustrates a table 1000 indicating the results for the real-life workload. The delta sampling determined probability of correction selection is shown at value 1002 for 50 representative configurations, at value 1004 for 100 representative configurations, and at value 1006 for 500 representative configurations. The delta sampling maximum difference in cost of the selected configuration is shown at value 1012 for 50 representative configurations, at value 1014 for 100 representative configurations, and at value 1016 for 500 representative configurations. The delta sampling with no stratification determined probability of correction selection is shown at value 1022 for 50 representative configurations, at value 1024 for 100 representative configurations, and at value 1026 for 500 representative configurations. The delta sampling with no stratification maximum difference in cost of the selected configuration is shown at value 1032 for 50 representative configurations, at value 1034 for 100 representative configurations, and at value 1036 for 500 representative configurations. The equal allocation alternative sampling determined probability of correction selection is shown at value 1042 for 50 representative configurations, at value 1044 for 100 representative configurations, and at value 1046 for 500 representative configurations. The equal allocation alternative sampling maximum difference in cost of the selected configuration is shown at value 1052 for 50 representative configurations, at value 1054 for 100 representative configurations, and at value 1056 for 500 representative configurations.

Sampling queries from a representative workload based on a probability of correct selection may provide scalability, quality of configuration, and/or adaptivity. For example, sampling based on a probability of correct selection may provide better quality when the representative workload includes only a few query templates which contain the most expensive queries. In some cases, if the counters and measurements are maintained and added to incrementally when adding query samples, the probability of correct selection may provide a reduction in computational cost as compared to other workload compression techniques. Furthermore, sampling based on a probability of correct selection does not require an initial guess of a sensitivity parameter such as a maximum allowable increase in the estimated running time when queries are discarded and the percentage of total cost retained, which affects the sample size. In contrast, dynamically basing sampling on the probability of correct selection allows the sample size to be adjusted based on the configuration space and/or representative workload which may provide a better configuration in many cases since the sample size may be different for different sets of candidate configurations (e.g., differing number of configurations, difference between configurations, and the like).

While the preferred embodiment of the invention has been illustrated and described, it will be appreciated that various changes can be made therein without departing from the spirit and scope of the invention.

The invention claimed is:
1. A method of configuring a database through a database configuration system, the database configuration system having a computing device, the method comprising:
    a) determining at least two configurations of a database system, each configuration containing one or more tables, indices, and/or views;
    b) sampling a first configuration and a second configuration from the at least two configurations;
    c) determining a representative workload containing at least one query executable against the database system;
    d) sampling a sample workload from at least a portion of the representative workload;
    e) estimating a cost of executing the sample workload based on the first configuration and the second configuration;

f) determining a probability of correct selection of the first configuration and the second configuration;
g) determining a probability of correct selection of the sample workload based at least in part on the probability of correct selection of the first configuration and the second configuration and a sensitivity parameter that represents an estimated difference in cost between the first configuration and the second configuration;
h) updating the sample workload when the probability of correct selection of the sample workload does not exceed a target probability threshold; and
i) when the probability of correct selection of the sample workload exceeds the target probability threshold, configuring the data store based on a best configuration of the first configuration and the second configuration based on the estimated cost.

2. The method of claim 1, wherein sampling a sample workload includes using independent sampling.

3. The method of claim 1, wherein estimating a cost of executing includes estimating a first cost of executing the sample workload based on the first configuration and estimating a second cost of executing for the sample workload based on the second configuration.

4. The method of claim 3, wherein updating the sample workload includes adding one or more queries from the representative workload to the sample workload such that the sum of the variances of the estimated cost is reduced.

5. The method of claim 1, wherein sampling a sample workload includes using delta sampling.

6. The method of claim 1, wherein estimating a cost of executing includes estimating a difference in cost of executing the sample workload based on the first configuration and the second configuration, and further eliminating an individual configuration as an incorrect choice where the difference in estimated costs is less than 0 and a true difference in costs is greater than the sensitivity parameter.

7. The method of claim 1, further comprising stratifying the representative workload into at least two strata including a first stratum and a second stratum, and determining a minimum number of queries to achieve the probability of correct selection of the sample workload, and wherein updating the sample workload includes selecting the minimum number of queries from the first stratum.

8. The method of claim 7, wherein updating the sample workload includes selecting the minimum number of queries from each of the at least two strata.

9. The method of claim 7, wherein stratifying the representative workload includes determining a query template for each query contained in the representative workload, determining an average cost of execution for each determined query template; and ordering the queries of the representative workload based on the average cost per template, and splitting the representative workload based on a split point of the ordered queries.

10. The method of claim 1, further comprising estimating an upper cost bound and a lower cost bound for queries in the representative workload which are not included in the sample workload, verifying an assumption in determining the probability of correct selection of the first configuration and the second configuration based on the upper and lower cost bounds, and returning to updating the sample workload when the assumption is not verified.

11. The method of claim 10, wherein verifying an assumption includes verifying that a sufficient number of queries have been included in the sample workload by determining an upper bound on a skew of the queries in the representative workload which are not included in the sample workload, and based on the upper bound of the skew, determining a minimum sample size of queries from the representative workload to be included in the sample workload.

12. The method of claim 11, wherein determining an upper bound on the skew includes rounding a plurality of cost variables to multiples of a factor k.

13. The method of claim 10, wherein verifying an assumption includes verifying that a variance of sampled queries in the sample workload represents a true variance by determining an upper bound on a variance of the estimated cost and determining a probability of correct selection based on the determined upper bound on the variance.

14. The method of claim 13, wherein determining an upper bound on the variance includes rounding a plurality of cost variables to multiples of a factor $\rho$.

15. A computer readable storage medium having computer executable components comprising:
a) a data store component configured to store a data store against which queries may be executed;
b) an optimizer component configured to determine a cost of executing a query against the data store component having a given configuration;
c) a workload module configured to determine a sample workload containing a plurality of queries sampled from a representative workload for the data store component;
d) a configuration module configured to determine a plurality of evaluation configurations from within a configuration space to be evaluated in configuring the data store component;
e) a cost module configured to determine an estimated cost of executing the sample workload based on the evaluation configurations and a sampling method; and
f) a probability module configured to determine a probability of correct selection of the sample workload and to output the best configuration, that satisfies a sensitivity parameter, from the evaluation configurations without determining a true difference in costs between the evaluation configurations, such that the probability of correct selection of the sample workload is greater than a target probability threshold.

16. The computer readable medium of claim 15, wherein the workload module stratifies the representative workload based on an average cost of queries having an identical query template.

17. The computer readable medium of claim 15, wherein the probability module verifies applicability of the Central Limit Theorem.

18. The computer readable medium of claim 15, further comprising modifying the data store component to have the determined best configuration.

19. A database configuration system comprising:
a) a data store for storing query information;
b) a memory in which machine instructions are stored; and
c) a processor that is coupled to the memory and the data store, the processor executing the machine instructions to carry out a plurality of functions, the machine instructions including:
  i) means for determining a sample workload from a representative workload containing a plurality of queries;
  ii) means for determining a plurality of evaluation configurations from a configuration space for a database system, individual evaluation configurations including any combination of one or more tables, indices, and/or views;
  iii) means for estimating a cost of executing the sample workload against the database system having an individual evaluation configuration, the cost of executing the sample workload is a time to execute the plurality of queries and includes an upper bound and a lower bound, the means for estimating further configured to employ a sensitivity parameter to avoid sampling a large fraction of the sample workload for evaluation configurations with similar costs; and iv) means for determining a probability of selecting a correct workload, based on the upper and lower bounds of the cost of executing, such that the probability of selecting a correct workload exceeds a target probability threshold.

20. The system of claim 19, wherein the machine instructions include means for stratifying the representative workload based on an average cost of queries in each identical template.

* * * * *